(12) United States Patent
Qiu

(10) Patent No.: US 12,714,954 B2
(45) Date of Patent: Aug. 25, 2026

(54) FILTER CARTRIDGE AND FILTER HAVING SAME

(71) Applicant: Solventum Intellectual Properties Company, Maplewood, MN (US)

(72) Inventor: Biyong Qiu, Shanghai (CN)

(73) Assignee: Solventum Intellectual Properties Company, Eagan, MN (US)

( * ) Notice: Subject to any disclaimer, the term of this patent is extended or adjusted under 35 U.S.C. 154(b) by 378 days.

(21) Appl. No.: 18/554,344

(22) PCT Filed: Apr. 8, 2021

(86) PCT No.: PCT/CN2021/085864
§ 371 (c)(1),
(2) Date: Oct. 6, 2023

(87) PCT Pub. No.: WO2022/213309
PCT Pub. Date: Oct. 13, 2022

(65) Prior Publication Data

US 2024/0375026 A1 Nov. 14, 2024

(51) Int. Cl.
*B01D 27/08* (2006.01)
*B01D 27/10* (2006.01)
(Continued)

(52) U.S. Cl.
CPC ........... *B01D 27/08* (2013.01); *B01D 27/108* (2013.01); *B01D 29/15* (2013.01); *B01D 35/153* (2013.01); *B01D 2201/302* (2013.01)

(58) Field of Classification Search
None
See application file for complete search history.

(56) References Cited

U.S. PATENT DOCUMENTS 4,087,486 A 5/1978 Fielding et al.
4,251,646 A 2/1981 Smith, Jr.
(Continued)

FOREIGN PATENT DOCUMENTS

AU 2021439656 A1 10/2023
CN 105540902 A 5/2016
(Continued)

OTHER PUBLICATIONS

International Search Report for PCT International Application No. PCT/CN2021/085864, mailed on Jan. 6, 2022, 4 pages.
(Continued)

*Primary Examiner* — Krishnan S Menon

(57) ABSTRACT

The present disclosure relates to a filter cartridge and a filter. The filter cartridge includes: a filter cartridge housing portion, the filter cartridge housing portion being provided with a water inlet; and a filtration unit, the filtration unit being provided in the filter cartridge housing portion. The filtration unit is provided with a front filtration medium and a rear filtration medium. The filtration unit is configured to cause raw water flowing into the filter cartridge housing portion by means of the water inlet to be filtered by the front filtration medium to obtain a first filtered fluid, and the first filtered fluid selectively flows toward a first water outlet, and/or flows toward a second water outlet after being filtered by the rear filtration medium. The filter includes the above filter cartridge. The filter cartridge and the filter according to the present disclosure can filter raw water to different levels as desired, and have a simple structure and a compact arrangement, thereby reducing the space occupied by the filter.

18 Claims, 23 Drawing Sheets

(51) Int. Cl.
*B01D 29/15* (2006.01)
*B01D 35/153* (2006.01)

(56) References Cited

U.S. PATENT DOCUMENTS

| | | | |
|---|---|---|---|
| 6,290,893 B1 | 9/2001 | Groleau | |
| 10,363,691 B2 | 7/2019 | Peplinski et al. | |
| 2005/0040097 A1 | 2/2005 | Bassett et al. | |
| 2005/0067084 A1 | 3/2005 | Kagan et al. | |
| 2016/0339371 A1 | 11/2016 | Cupit | |

FOREIGN PATENT DOCUMENTS

| | | | | | |
|---|---|---|---|---|---|
| CN | 206352080 U | | 7/2017 | | |
| CN | 206428095 U | | 8/2017 | | |
| CN | 207545995 U | | 6/2018 | | |
| CN | 208975241 U | | 6/2019 | | |
| CN | 110404329 A | | 11/2019 | | |
| CN | 111263853 A | * | 6/2020 | ............. | F02M 37/48 |
| CN | 212396050 U | | 1/2021 | | |
| CN | 113149272 A | | 7/2021 | | |
| CN | 112250218 B | | 4/2023 | | |
| DE | 102008020223 A1 | | 9/2009 | | |
| EP | 0463368 B1 | | 8/1998 | | |
| EP | 0647681 B1 | | 8/1999 | | |
| EP | 1640134 B1 | | 12/2008 | | |
| EP | 1612023 B1 | | 10/2013 | | |
| EP | 3594184 A1 | | 1/2020 | | |
| EP | 3652046 B1 | | 3/2021 | | |
| EP | 4319898 A1 | | 2/2024 | | |
| GB | 1604832 A | | 12/1981 | | |
| GB | 1604833 A | | 12/1981 | | |
| WO | 199313923 A1 | | 7/1993 | | |
| WO | 200074922 A1 | | 12/2000 | | |
| WO | 200124986 A1 | | 4/2001 | | |
| WO | 2004078848 A1 | | 9/2004 | | |
| WO | 2008083255 A1 | | 7/2008 | | |
| WO | WO-2019085871 A1 | * | 5/2019 | ............. | B01D 36/02 |

OTHER PUBLICATIONS

Supplementary European Search Report, mailed on Oct. 30, 2024, 8 page.
DE 102008020223 A1, Patent Translate.

* cited by examiner

FILTER CARTRIDGE AND FILTER HAVING SAME

CROSS REFERENCE TO RELATED APPLICATIONS

This application is a national stage filing under 35 U.S.C. 371 of PCT/CN2021/085864, filed Apr. 8, 2021, the disclosure of which is incorporated by reference in its/their entirety herein.

TECHNICAL FIELD

The present disclosure relates to the field of filtration, and in particular relates to a filter cartridge and a filter having the filter cartridge.

BACKGROUND

The content of this part provides only background information related to the present disclosure, and does not necessarily constitute the prior art.

Filters are widely used in industrial production and daily life, and are often used to filter various fluids. Water purifiers are common filters, and are widely used in household water systems to eliminate water pollution incurred by a water source, a transportation process, etc. and an effect of the same on water quality, so as to ensure safe water. In household water consumption, according to different purposes of use, there are different requirements on water quality of filtered water. For example, for an application having relatively high requirements on water quality (for example, drinking water acquired after filtration), raw water (for example, municipal tap water) often needs to be filtered to a relatively high level; and for an application having relatively low requirements on water quality, the raw water does not need to be filtered to a relatively high level. If all of the raw water has the same water quality after being filtered by the filter, then the filtered water cannot meet the above two aspects of requirements at the same time. If all of the raw water is filtered to a relatively high level, then the filtration is not necessary for the application having relatively low requirements on water quality, and unnecessarily increases a filtration load of the water purifier. In contrast, if all of the raw water is filtered only to a relatively low level, then the quality of the filtered water cannot meet the requirements of the application having relatively high requirements on quality. In addition, a simple and compact structure has always been a tendency to develop water purifiers.

Therefore, it is desired to provide a novel filter cartridge and filter. The filter cartridge and the filter can filter raw water to a corresponding level according to the purpose of use so as to meet different requirements on quality of filtered water. In addition, it is also desired that the filter has a simpler and more compact structure.

SUMMARY

The objective of the present disclosure is to provide an improved filter cartridge and filter so as to filter raw water to different levels according to purposes of use, and the structures of the filter cartridge and the filter are simple and compact.

An aspect of the present disclosure provides a filter cartridge, the filter cartridge comprising: a filter cartridge housing portion, the filter cartridge housing portion being provided with a water inlet; and a filtration unit, the filtration unit being provided in the filter cartridge housing portion. The filtration unit is provided with a front filtration medium and a rear filtration medium. The filtration unit is configured to cause raw water flowing into the filter cartridge housing portion by means of the water inlet to be filtered by the front filtration medium to obtain a first filtered fluid; and the first filtered fluid selectively flows toward a first water outlet, and/or flows toward a second water outlet after being filtered by the rear filtration medium.

The filtration unit comprises a hollow cover, an inner housing, and a mounting base, and the cover is sealedly connected to the inner housing. The front filtration medium is mounted between the inner housing and the mounting base, a first filtered fluid channel is formed in the filtration unit, and the first filtered fluid filtered by the front filtration medium enters the first filtered fluid channel. An accommodation space is formed in the inner housing, the rear filtration medium is provided in the accommodation space, the inner housing is configured so that the accommodation space is located downstream of the first filtered fluid channel, in fluid communication with the second water outlet, and selectively in fluid communication with the first filtered fluid channel.

The filtration unit further comprises a valve member provided in the inner housing, and the valve member is configured to selectively open or close according to fluid pressure in the filter cartridge so that one or both of the first water outlet and the second water outlet are selectively in fluid communication with the first filtered fluid channel.

In an embodiment, the first water outlet is in fluid communication with the first filtered fluid channel, and the valve member is configured to selectively cause the second water outlet to be in fluid communication with the first filtered fluid channel.

In an embodiment, when the valve member opens, the first water outlet and the second water outlet are both in fluid communication with the first filtered fluid channel, and when the valve member closes, the first water outlet and the second water outlet are not in fluid communication with the first filtered fluid channel.

The filtration unit further comprises a first blocking member, the first blocking member is provided at a fluid outlet of the accommodation space, and is configured to prevent the rear filtration medium from leaving the accommodation space from the fluid outlet of the accommodation space, but to allow the first filtered fluid to flow through the first blocking member toward the second water outlet after being filtered by the rear filtration medium.

Preferably, the filtration unit further comprises a second blocking member, and the second blocking member is provided at a fluid inlet of the accommodation space, and is configured to prevent the rear filtration medium from leaving the accommodation space from the fluid inlet of the accommodation space, but to allow the first filtered fluid to enter the accommodation space.

The inner housing is provided with: a substrate portion; a first annular wall portion, the first annular wall portion extending axially from the substrate portion toward a first side, and the first annular wall portion being sealedly connected to the cover; a second annular wall portion, the second annular wall portion extending axially from the substrate portion toward a second side opposite the first side, and the second annular wall portion being inserted in the first filtered fluid channel; and a central cylindrical portion, the central cylindrical portion extending axially from the substrate portion toward the first side, and being located on a radial inner side of the first annular wall portion.

In an embodiment, the central cylindrical portion, the substrate portion, and the first annular wall portion jointly define the accommodation space. The central cylindrical portion further extends axially from the substrate portion toward the second side into the first filtered fluid channel so as to form an annular space between the second annular wall portion and the central cylindrical portion, and the annular space is located upstream of the accommodation space and in fluid communication with the accommodation space. The valve member is mounted to the central cylindrical portion or the second annular wall portion, and the valve member is configured so that a valve plate of the valve member selectively establishes or interrupts fluid communication between the annular space and the first filtered fluid channel.

When fluid pressure in the accommodation space is lower than fluid pressure in the first filtered fluid channel, the valve member opens, and the valve plate establishes the fluid communication between the annular space and the first filtered fluid channel so that the first filtered fluid in the first filtered fluid channel flows through the annular space, enters the accommodation space, and flows out of the second water outlet after being filtered by the rear filtration medium. When the fluid pressure in the accommodation space is higher than or equal to the fluid pressure in the first filtered fluid channel, the valve plate interrupts the fluid communication between the annular space and the first filtered fluid channel.

The central cylindrical portion is connected to a first water outlet pipe, or is integrally formed with the first water outlet pipe, and the first filtered fluid flows toward the second water outlet by means of a second filtered fluid channel in the cover after being filtered by the rear filtration medium.

In an embodiment, the filter cartridge further comprises a flow guide member, the flow guide member is provided in the inner housing; the flow guide member, the substrate portion, and the first annular wall portion jointly define the accommodation space. The flow guide member comprises a shielding body and a pipe portion communicating with each other, an open end of the shielding body is mounted to the substrate portion to accommodate the valve member and the central cylindrical portion in the shielding body, and the interior of the shielding body is in fluid communication with the accommodation space and the first water outlet. The substrate portion is provided with a central through hole, and the central through hole is located on a radial inner side of the central cylindrical portion and in fluid communication with the first filtered fluid channel. The valve member is configured to cause the interior of the shielding body to be selectively in fluid communication with the first filtered fluid channel by means of the central through hole.

In an embodiment, the valve member comprises: a valve seat, wherein the valve seat is provided with a window portion, the valve seat is mounted in the central cylindrical portion, the valve seat sealedly engages with an inner wall of the central cylindrical portion, the window portion is in fluid communication with the interior of the shielding body; and a piston, wherein the piston is capable of moving axially in the valve seat to establish or interrupt fluid communication between the window portion and the first filtered fluid channel.

In an embodiment, the valve member further comprises an elastic element provided on the piston. When fluid pressure of the first filtered fluid in the first filtered fluid channel is sufficient to overcome a force applied on the piston by a fluid in the flow guide member and the elastic element, the piston moves to an open position so that the window portion is in fluid communication with the first filtered fluid channel. When the fluid pressure of the first filtered fluid in the first filtered fluid channel is not sufficient to overcome the force applied on the piston by the fluid in the flow guide member and the elastic element, the piston moves to a closed position so that the fluid communication between the window portion and the first filtered fluid channel is interrupted.

The pipe portion of the flow guide member is connected to a first water outlet pipe, or is integrally formed with the first water outlet pipe, and the first filtered fluid flows toward the second water outlet by means of a second filtered fluid channel in the cover after being filtered by the rear filtration medium.

In an embodiment, the front filtration medium comprises a first filtration medium and a second filtration medium, and the rear filtration medium comprises a third filtration medium.

In an embodiment, the raw water is municipal tap water, the first filtration medium is mounted around the second filtration medium and is located on a radial outer side of the second filtration medium, the second filtration medium has a hollow cylindrical shape, and the first filtered fluid channel is at least partially formed in the second filtration medium.

Another aspect of the present disclosure provides a filter, the filter comprising a water faucet, and the filter further comprising the filter cartridge according to the present disclosure. The water faucet can be operated so that a water outlet end of the water faucet selectively communicates with one or both of the first water outlet and the second water outlet of the filter cartridge.

When the water outlet end of the water faucet communicates with the second water outlet, the first filtered fluid flows toward the water outlet end from the second water outlet after being filtered by the rear filtration medium.

In the present disclosure, the filter cartridge is provided with a plurality of stages of filtration media, and the raw water is caused to selectively flow through part of or all of the plurality of stages of the filtration media, so that fluids can be filtered in the filter to different levels by means of only one filter cartridge according to purposes of use; in addition, mixing of fluids having different levels of filtration can be avoided, and the filtration media can be prevented from being mixed into the filtered fluid. The filter cartridge and the filter according to the present disclosure have a simple structure and a compact arrangement, thereby reducing the space occupied by the filter.

BRIEF DESCRIPTION OF THE DRAWINGS

Embodiments of the present disclosure are described below merely as examples with reference to the accompanying drawings. In the accompanying drawings, the same features or components are represented by the same reference numerals, and the accompanying drawings are not necessarily drawn to scale. Further, in the accompanying drawings.

DETAILED DESCRIPTION

Figure 1:
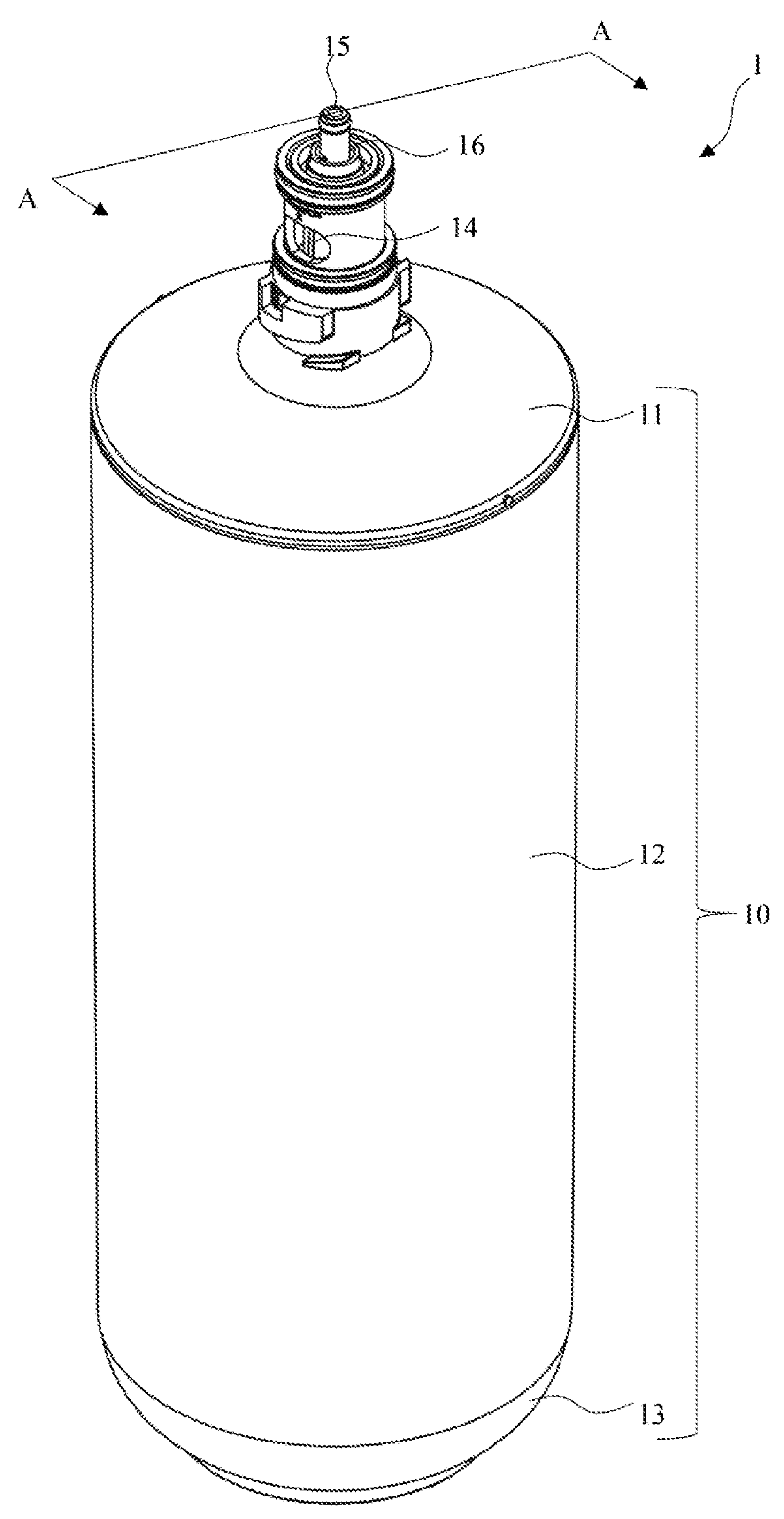
FIG. 1 shows a perspective view of a filter cartridge of a filter according to a first embodiment of the present disclosure.

The following descriptions are substantially merely exemplary, and are not intended to limit the present disclosure, application and use thereof. It should be understood that in all of the accompanying drawings, similar reference numerals represent the same or similar parts and features. The accompanying drawings illustratively show the idea and principles of the embodiments of the present disclosure, but do not necessarily show specific size of each embodiment of the present disclosure and the scale thereof. In some parts of specific accompanying drawings, related details or structures of the embodiments of the present disclosure may be illustrated in an exaggerated manner.

In the descriptions of the embodiments of the present disclosure, the directional terms related to “up” and “down” are described according to the upper and lower positions in the views shown in the accompanying drawings. In an actual application, the “up” and “down” position relationships used in the present disclosure may be defined according to actual conditions, and these relationships can also be reversed.

A filter cartridge and a filter having the filter cartridge according to the present disclosure can be used for filtering municipal tap water, and can also be used for filtering other fluids. With reference to the accompanying drawings, as an example of application of a filter in a municipal tap water filtration system, the filter cartridge and the filter according to the present disclosure are described below by using an example in which a water purifier serves as the filter.

Figure 2:
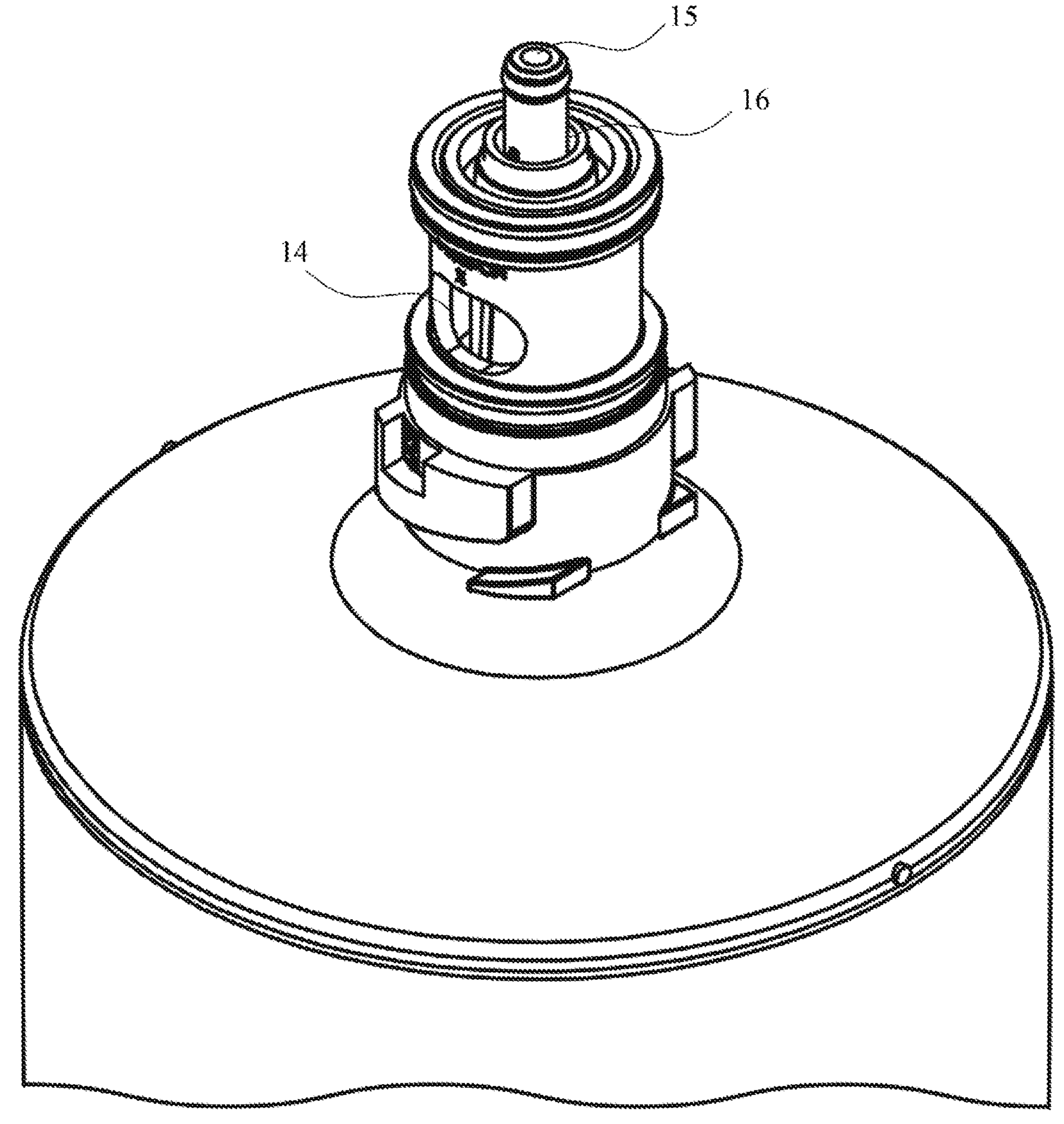
FIG. 2 shows a partially enlarged view of the filter cartridge in FIG. 1.

FIG. 1 shows a perspective view of a filter cartridge 1 of a filter according to a first embodiment of the present disclosure, and FIG. 2 shows a partially enlarged view of the filter cartridge 1.

As shown in FIG. 1, the filter cartridge 1 includes a filter cartridge housing portion 10. The filter cartridge housing portion 10 includes a filter cartridge housing top cover 11, a filter cartridge housing 12, and a filter cartridge housing bottom cover 13. In the present exemplary embodiment, the filter cartridge housing top cover 11 is sealedly attached to an upper end portion of the filter cartridge housing 12 in a detachable manner, and the filter cartridge housing 12 is integrally formed with the filter cartridge housing bottom cover 13. However, the present disclosure is not limited thereto. In another possible modification of the present disclosure, the filter cartridge housing bottom cover 13 may be sealedly attached to a lower end portion of the filter cartridge housing 12 in a detachable or non-detachable manner. In another possible modification of the present disclosure, the filter cartridge housing top cover 11 may be integrally formed with the filter cartridge housing 12, and the filter cartridge housing bottom cover 13 is sealedly attached to the lower end portion of the filter cartridge housing 12 in a detachable manner. The filter cartridge 1 is provided with a water inlet 14, a first water outlet 15, and a second water outlet 16. The water inlet 14 is provided on a circumferential wall portion of an upper portion of the filter cartridge housing top cover 11. One water inlet 14 may be provided, or a plurality of water inlets 14 spaced apart from each other may be provided. In the present example, two water inlets 14 spaced apart from each other are provided. As more clearly shown in FIG. 2, the first water outlet 15 is located at the center of the filter cartridge 1, the second water outlet 16 surrounds the first water outlet 15 and is located on a radial outer side of the first water outlet 16, and the water inlet 14 is located on a radial outer side of the second water outlet 16. Raw water (for example, municipal tap water) enters the filter cartridge 1 by means of the water inlet 14, and flows out of the first water outlet 15 and/or the second water outlet 16 for use after being filtered by the filter cartridge 1.

Figure 3:
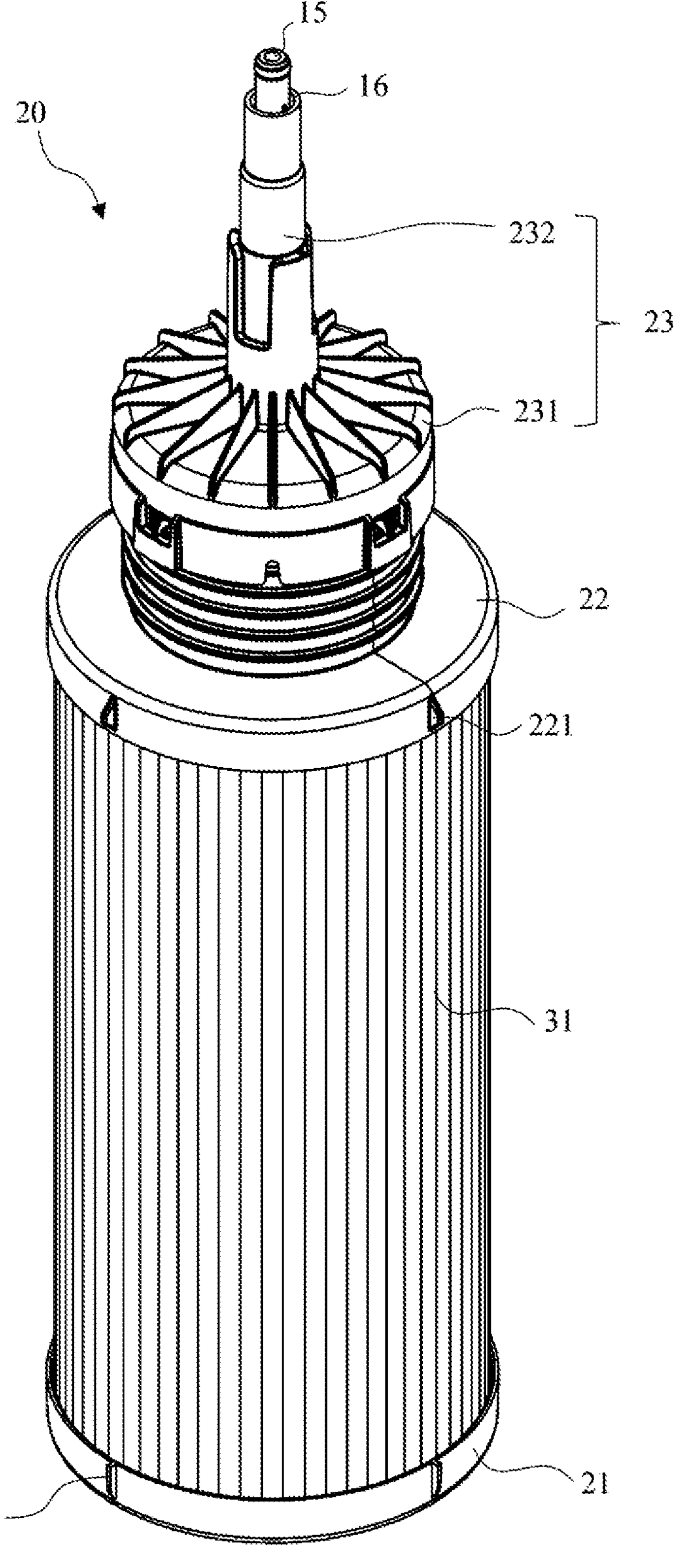
FIG. 3 shows a perspective view of the filter cartridge in FIG. 1 after an outer housing thereof is removed.

The filter cartridge 1 further includes a filtration unit 20 provided in the filter cartridge housing portion 10. FIG. 3 shows a perspective view of the filter cartridge 1 after the filter cartridge housing portion 10 thereof is removed, and shows the filtration unit 20. As shown in FIG. 3, the filtration unit 20 includes a mounting base 21, an inner housing 22, a cover 23, and a filtration medium. In FIG. 3, only a first filtration medium 31 is visible. The cover 23 includes a base portion 231 and a pipe portion 232 extending axially from the base portion 231. The base portion 231 is sealedly mounted to the inner housing 22. An outer circumference of the inner housing 22 is provided with a plurality of protrusion portions 221 spaced apart from each other. An outer circumference of the mounting base 21 is also provided with a plurality of protrusion portions 211 spaced apart from each other. For example, in an example, the outer circumference of the inner housing 22 is provided with four protrusion portions 221 spaced apart from each other, and the outer circumference of the mounting base 21 is also provided with four protrusion portions 211 spaced apart from each other. FIG. 3 shows only two of the protrusion portions 221 and two of the protrusion portions 211. When the filtration unit 20 is mounted in the filter cartridge housing portion 10, the protrusion portion 221 and the protrusion portion 211 may contact an inner wall of the filter cartridge housing portion 10, so that the filtration unit 20 is stably held in the filter cartridge housing portion 10.

Figure 4:
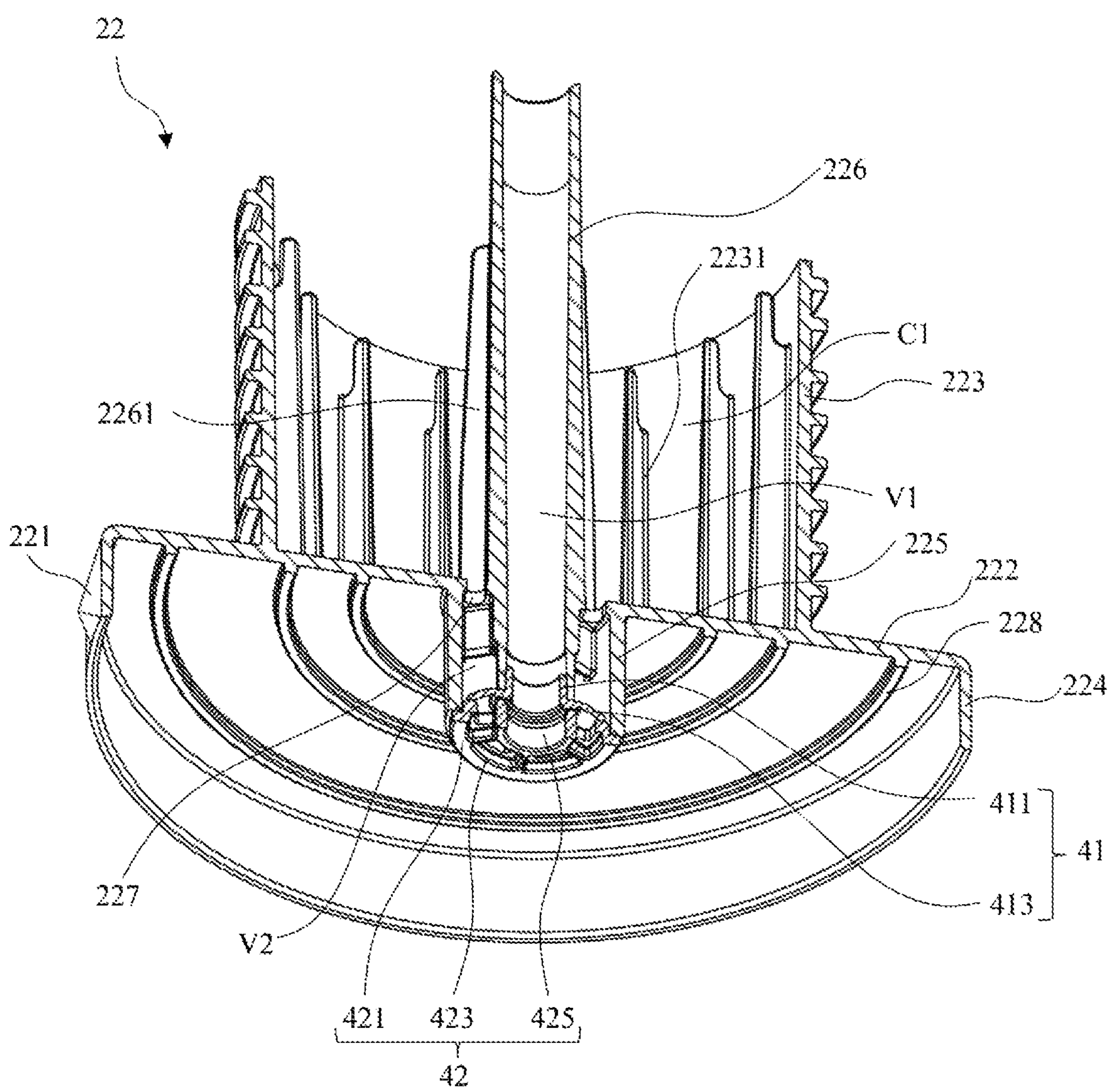
FIG. 4 and FIG. 5 show sectional views of an inner housing of the filter cartridge in FIG. 1, and respectively show different states of a valve member.
Figure 5:
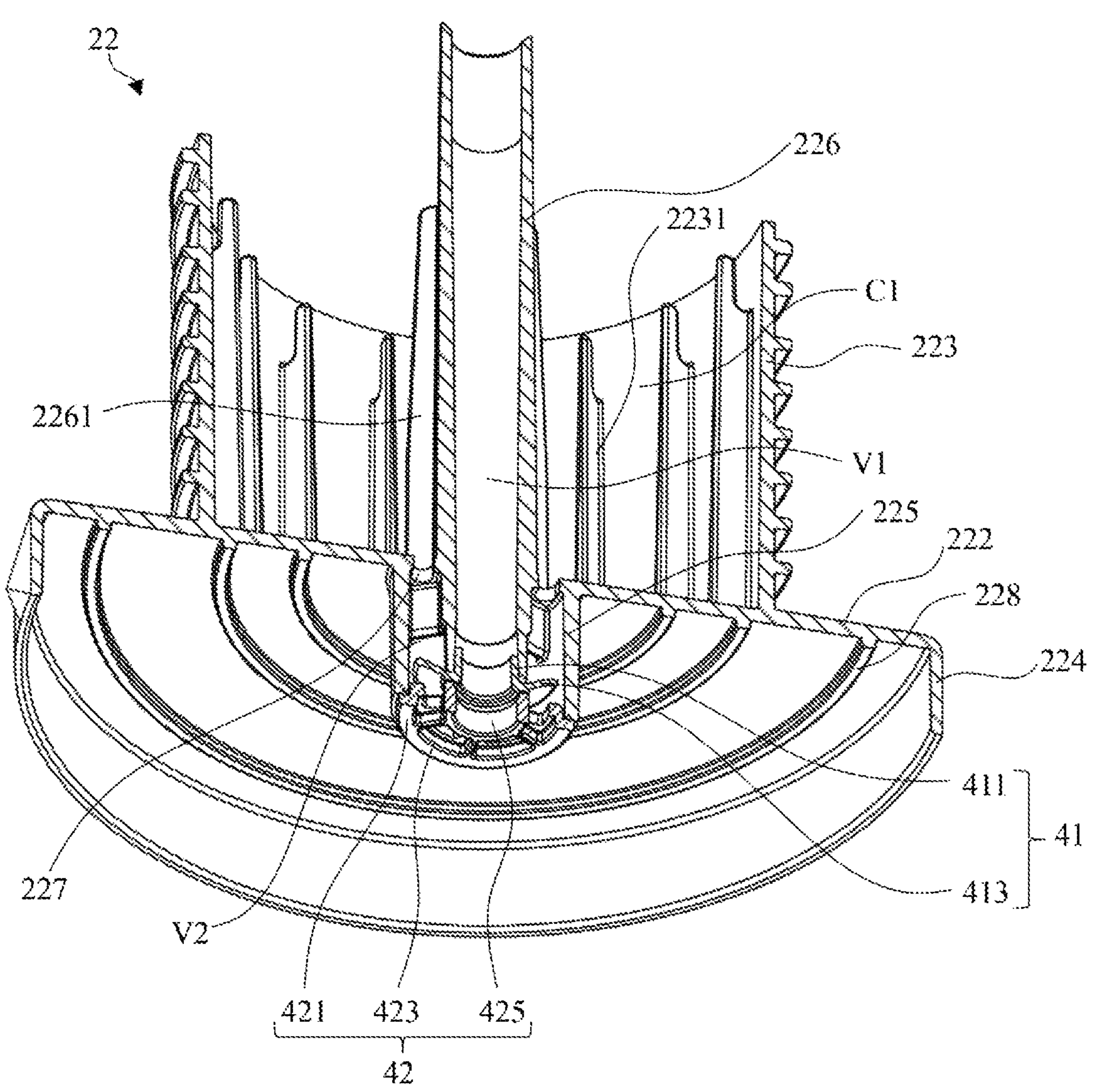
Figure 6:
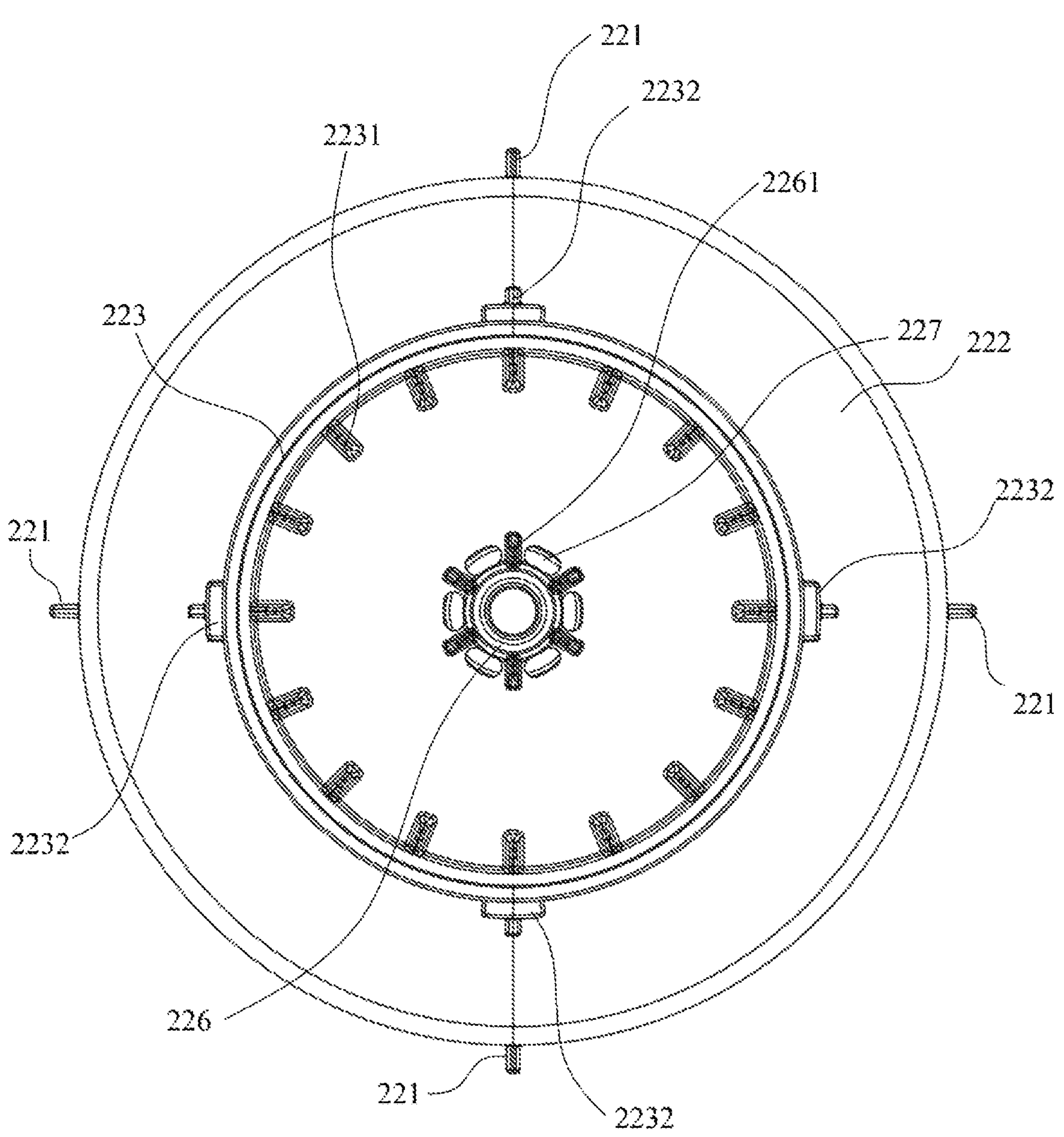
FIG. 6 shows a top view of an inner housing of the filter cartridge in FIG. 1.

FIG. 4 and FIG. 5 show sectional views of the inner housing 22, and FIG. 6 shows a top view of the inner housing 22. As shown in FIG. 4 and FIG. 5, the inner housing 22 includes a substrate portion 222, a first annular wall portion 223, a flange 224, a second annular wall portion 225, and a central cylindrical portion 226. The central cylindrical portion 226 extends through the substrate portion 222, extends axially from a central region of the substrate portion 222 toward two sides, and has an internal channel V1. The first annular wall portion 223 and the second annular wall portion 225 extend axially from the substrate portion 222 respectively toward opposite sides. In the example shown in FIG. 4 and FIG. 5, the first annular wall portion 223 extends axially from the substrate portion 222 toward a first side (an upper side in FIG. 4 and FIG. 5) so that the first annular wall portion, the central cylindrical portion 226, and the substrate portion 222 jointly define an annular accommodation space C1, and the second annular wall portion 225 extends axially from the substrate portion 222 toward a second side (a lower side in FIG. 4 and FIG. 5) opposite the first side so that the second annular wall portion and the central cylindrical portion 226 jointly define an annular space V2. As shown in FIG. 4 and FIG. 5, a plurality of protruding ribs 2231 circumferentially spaced apart from each other are formed on an inner circumferential surface of the first annular wall portion 223, and as shown in FIG. 6, a plurality of protruding portions 2232 circumferentially spaced apart from each other are formed on an outer circumferential surface of the first annular wall portion 223. The protruding portion 2232 of the first annular wall portion 223 engages with a corresponding portion of the cover 23. A length by which the central cylindrical portion 226 extends axially from the substrate portion 222 toward the upper side is greater than a length by which the first annular wall portion 223 extends. When the cover 23 is mounted to the inner housing 22, an upper end portion of the central cylindrical portion 226 is inserted into an internal channel of the cover 23. As shown in FIG. 6, an outer circumferential surface of the central cylindrical portion 226 is provided with a plurality of reinforcing ribs 2261 circumferentially spaced apart from each other. The reinforcing rib 2261 extends from the outer circumferential surface of the central cylindrical portion 226 to an upper surface of the substrate portion 222 so as to provide good support to the central cylindrical portion 226 and increase strength of the central cylindrical portion 226. In the example shown in the drawings, a distance by which the second annular wall portion 225 extends axially from the substrate portion 222 toward the second side (the lower side in FIG. 4 and FIG. 5) is greater than a distance by which the central cylindrical portion 226 extends axially from the substrate portion 222 toward the second side (the lower side in FIG. 4 and FIG. 5). The flange 224 extends axially downward from a radial outer end portion of the substrate portion 222. The protrusion portion 221 is provided on an outer circumferential surface of the flange 224. When viewed axially, the second annular wall portion 225 is located on a radial outer side of the central cylindrical portion 226, and the first annular wall portion 223 is located on a radial outer side of the second annular wall portion 225. As shown in FIG. 6, a plurality of through holes 227 circumferentially spaced apart from each other are formed on the substrate portion 222, and each through hole 227 is circumferentially located between adjacent reinforcing ribs 2261. As shown in FIG. 4 and FIG. 5, each through hole 227 is radially located between the second annular wall portion 225 and the central cylindrical portion 226. The through holes 227 form a fluid inlet of the accommodation space C1. The accommodation space C1 is in fluid communication with the annular space V2 by means of the through holes 227. The through hole 227 has a maximum size smaller than a particle diameter of solid particles of a third filtration medium 33 (shown in FIGS. 7-9) accommodated in the accommodation space C1 so as to prevent the third filtration medium 33 from leaving the accommodation space C1 by means of the through hole 227. In addition, as shown in FIG. 4 and FIG. 5, a lower surface of the substrate portion 222 is provided with a plurality of concentric annular protrusions 228 spaced apart from each other so as to hold the filtration medium. In the example shown in the drawings, the substrate portion 222, the first annular wall portion 223, the flange 224, the second annular wall portion 225, the central cylindrical portion 226, and the annular protrusion 228 are all integrally formed. However, the present disclosure is not limited thereto. In another example according to the present disclosure, at least one of the aforementioned portions may be separately formed and assembled together with other portions.

A valve member 41 is further provided in the inner housing 22. In the example shown in the drawings, the valve member 41 is configured as a one-way valve by using a flexible retainer. As shown in FIG. 4 and FIG. 5, the valve member 41 includes an annular mounting portion 411 and an annular valve plate 413 extending outward from an end (an axial lower end in FIG. 4 and FIG. 5) of the mounting portion 411. The mounting portion 411 and the valve plate 413 may be integrally formed, or may be separately formed and engaged together. At least the valve plate 413 is flexible. The valve member 41 is mounted to the inner housing 22 by means of a mounting member 42. The mounting member 42 includes an outer circumferential edge 421, a central through hole 425, and a plurality of through holes 423 located between the outer circumferential edge 421 and the central through hole 425 and spaced apart from each other. The outer circumferential edge 421 of the mounting member 42 engages with a lower end portion of the second annular wall portion 225 of the inner housing 22. An upper end portion of an annular wall portion of the central through hole 425 engages against a lower end portion of the central cylindrical portion 226 of the inner housing 22, and a radial inner end of the valve plate 413 of the valve member 41 is sandwiched between the lower end portion of the central cylindrical portion 226 and the mounting member 42, so that the valve plate 413 of the valve member 41 is suspended in the annular space V2. The valve plate 413 is configured to move relative to the central cylindrical portion 226 according to a force applied on the valve plate 413 by a fluid and a resilient force of the valve plate 413 so as to selectively establish or interrupt fluid communication between the annular space V2 and a space (namely, a first filtered fluid channel to be described below) below the mounting member 42. The valve plate 413 is can move away from the central cylindrical portion 226 to engage with the outer circumferential edge 421 of the mounting member 42 or engage with an inner wall of the second annular wall portion 225 of the inner housing 22 to block the through holes 423, thereby interrupting the fluid communication between the annular space V2 and the space below the mounting member 42, and therefore interrupting fluid communication between the accommodation space C1 and the space below the mounting member 42, as shown in FIG. 4. The valve plate 413 can also move toward the central cylindrical portion 226 without blocking the through holes 423 so as to cause the annular space V2 to be in fluid communication with the space below the mounting member 42 by means of the through holes 423, thereby establishing the fluid communication between the accommodation space C1 and the space below the mounting member 42, as shown in FIG. 5.

In the example shown in FIG. 4 and FIG. 5, the valve member 41 is mounted to the lower end portion of the central cylindrical portion 226 by means of the mounting member 42. However, the present disclosure is not limited thereto. In another example according to the present disclosure, the flexible valve member can also be mounted to the lower end portion of the second annular wall portion 225 so that the valve plate of the valve member is suspended in the annular space V2, as long as the valve plate is configured to selectively establish or interrupt the fluid communication between the annular space V2 and the space (namely, the first filtered fluid channel) below the mounting member.

Figure 7:
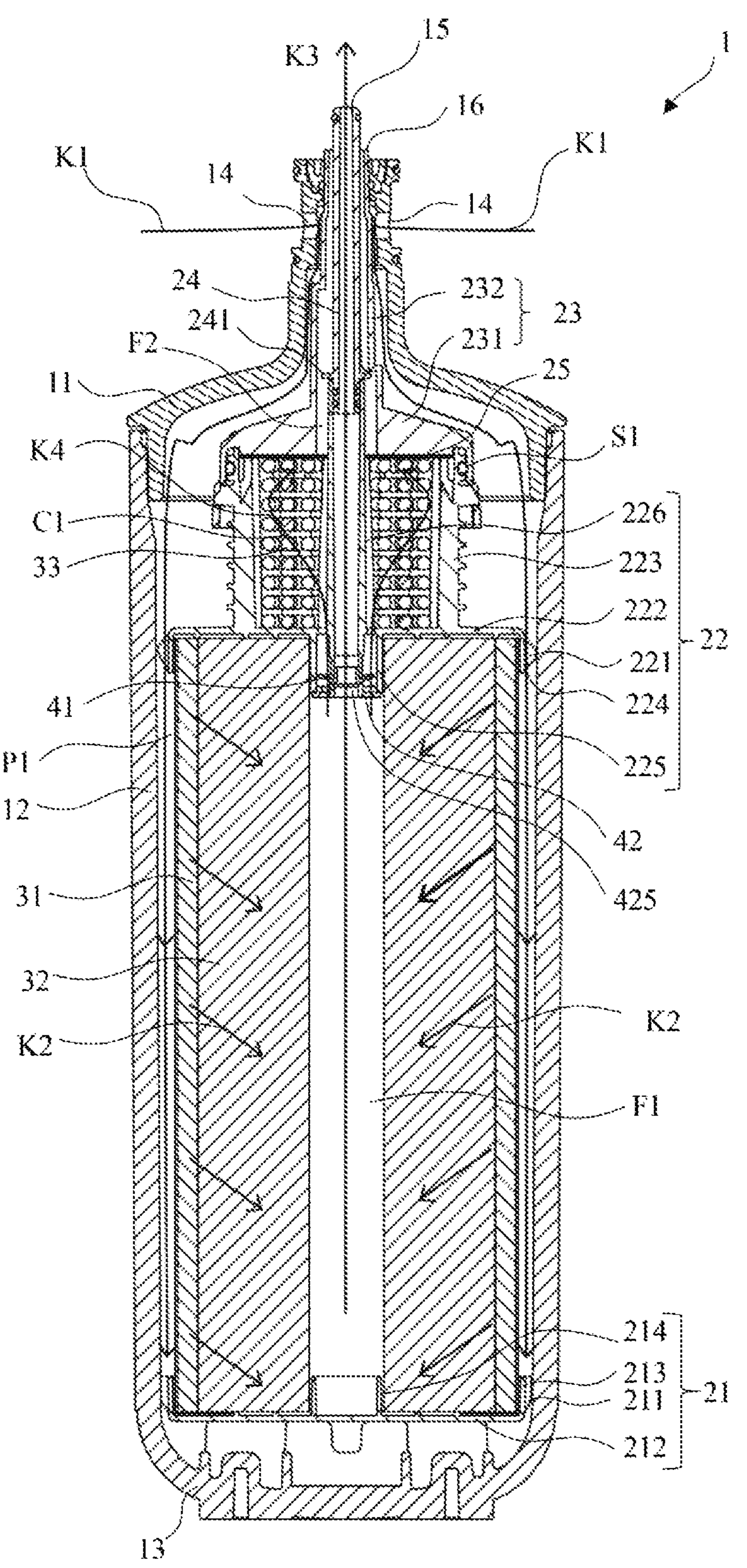
FIG. 7 shows a cross-sectional view taken along a section line A-A in FIG. 1.
Figure 8:
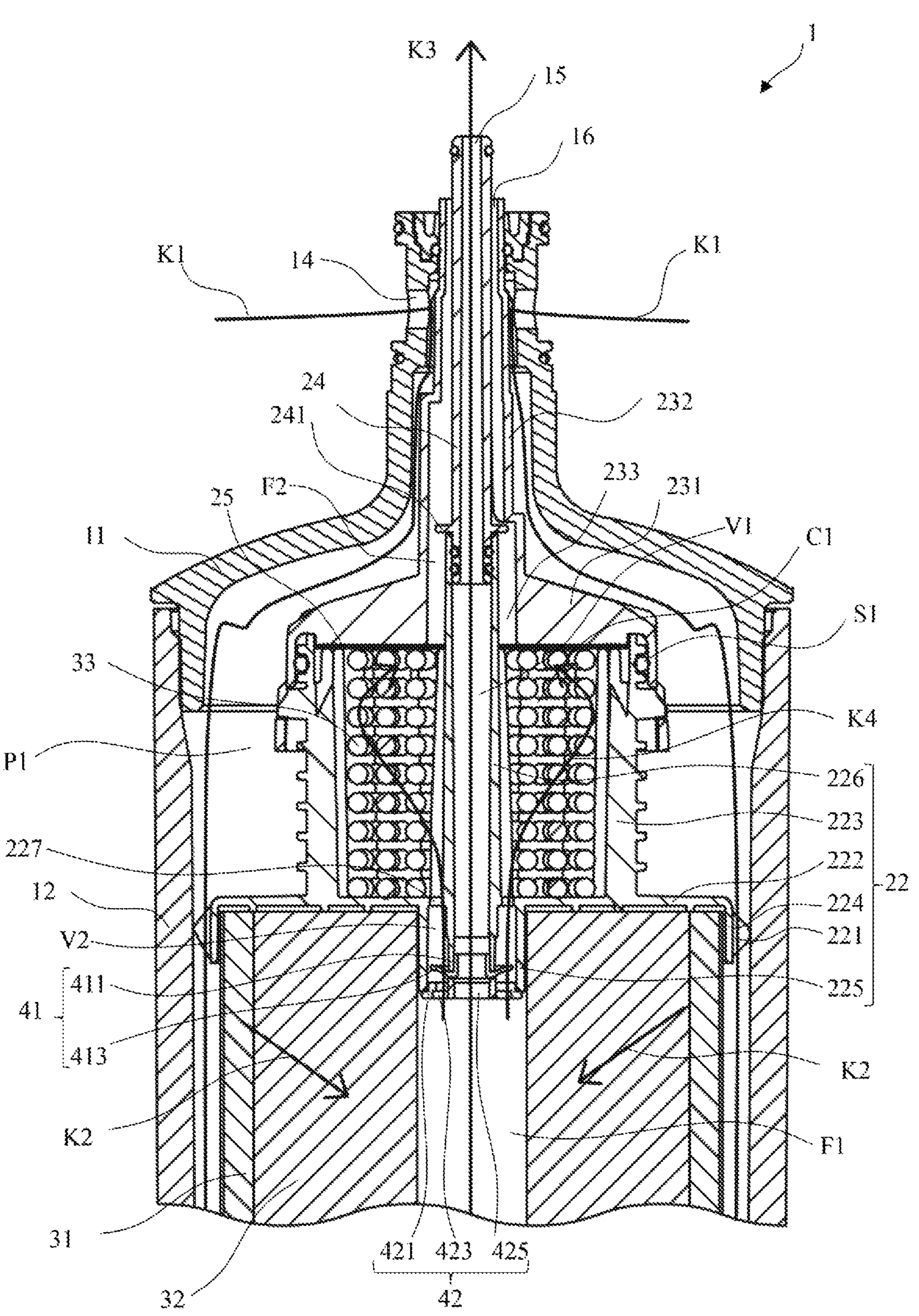
FIG. 8 shows a partially enlarged view of FIG. 7.

FIG. 7 shows a cross-sectional view taken along a section line A-A in FIG. 1, and shows an internal structure of the filter cartridge 1. FIG. 8 is a partially enlarged view of FIG. 7.

As shown in FIG. 7 and FIG. 8, the filtration unit 20 is mounted in the filter cartridge housing portion 10, and an annular raw water channel P1 is formed between the filter cartridge housing portion 10 and the filtration unit 20. The raw water enters the raw water channel P1 in the filter cartridge 1 by means of the water inlet 14, as shown by a line K1 with an arrowhead in FIG. 7. The base portion 231 of the cover 23 is sealedly mounted to the first annular wall portion 223 of the inner housing 22 by means of a seal S1 so as to prevent the raw water entering the raw water channel P1 from entering the accommodation space C1 of the inner housing 22 (see FIG. 4 and FIG. 5) and being mixed into the filtered water filtered by the filtration medium. The pipe portion 232 of the cover 23 is inserted into the filter cartridge housing top cover 11, and extends out of the filter cartridge housing top cover 11. The protrusion portion 221 of the inner housing 22 and the protrusion portion 211 of the mounting base 21 separately contact an inner wall of the filter cartridge housing 12 to stably hold the filtration unit 20 in the filter cartridge housing portion 10.

The filtration unit 20 is provided with a first filtration medium 31, a second filtration medium 32, and a third filtration medium 33. The first filtration medium 31 and the second filtration medium 32 form a front filtration medium, and the third filtration medium 33 forms a rear filtration medium. As shown in FIG. 7 and FIG. 8, the first filtration medium 31 and the second filtration medium 32 are mounted between the inner housing 22 and the mounting base 21 of the filtration unit 20. The first filtration medium 31 is mounted around the second filtration medium 32, and is located on a radial outer side of the second filtration medium 32. An upper end portion of the first filtration medium 31 is located on a radial inner side of the flange 224 of the inner housing 22. A lower end portion of the first filtration medium 31 is located on a radial inner side of an outer wall portion 213 of the mounting base 21. The flange 224 and the annular protrusion 228 of the inner housing 22 (see FIG. 4 and FIG. 5) and the outer wall portion 213 of the mounting base 21 define the position of the first filtration medium 31. In the present example, the first filtration medium 31 is configured to filter out particulate impurities or pathogenic bacteria in the raw water, and may be a collapsible microfiltration or ultrafiltration medium.

The second filtration medium 32 forms a cylindrical hollow structure, and a first filtered fluid channel F1 is formed therein. First filtered water (the first filtered fluid) filtered by the first filtration medium 31 and the second filtration medium 32 flows into the first filtered fluid channel F1. The second filtration medium 32 is mounted so that the second annular wall portion 225 of the inner housing 22 is inserted into one end (an upper end in FIG. 7 and FIG. 8) of the first filtered fluid channel F1, and an inner wall portion 214 of the mounting base 21 is inserted into another end (a lower end in FIG. 7 and FIG. 8) of the first filtered fluid channel F1. The second annular wall portion 225 and the annular protrusion 228 (see FIG. 4 and FIG. 5) of the inner housing 22 and the inner wall portion 214 of the mounting base 21 define the position of the second filtration medium 32. The inner wall portion 214 and the outer wall portion 213 of the mounting base 21 extend axially from the substrate 212 of the mounting base 21 toward the same side (the upper side in the drawings). The second filtration medium 32 is configured to adsorb or absorb pigments, odors, disinfectants, organic pollutants, heavy metals, etc. in the fluid. In an example, the second filtration medium 32 is a hollow activated carbon rod.

The third filtration medium 33 is provided in the accommodation space C1 of the inner housing 22 (see FIG. 4 and FIG. 5), and is configured to suppress scale in the fluid. The accommodation space C1 is located downstream of the first filtered fluid channel F1. In an example, the third filtration medium 33 is granular phosphate.

As shown in FIG. 7 and FIG. 8, a first water outlet pipe 24 is sealedly connected (for example, inserted) to the upper end portion of the central cylindrical portion 226 of the inner housing 22. A positioning flange 241 is formed at a lower end portion of the first water outlet pipe 24. When the first water outlet pipe 24 is connected to the upper end portion of the central cylindrical portion 226, the positioning flange 241 is settled on the upper end portion of the central cylindrical portion 226 to prevent the first water outlet pipe 24 from being excessively inserted into the central cylindrical portion 226. An upper end portion of the first water outlet pipe 24 forms the first water outlet 15. The first water outlet pipe 24 is inserted into the internal channel of the cover 23, and extends out of an upper end portion of the pipe portion 232. A space between an inner wall of the internal channel of the cover 23 and the first water outlet pipe 24 and the central cylindrical portion 226 form an annular second filtered fluid channel F2. The positioning flange 241 is configured to maintain fluid communication of the second filtered fluid channel F2. For example, a size of the positioning flange 241 is configured so that an outer circumferential edge of the positioning flange 241 does not contact the inner wall of the internal channel of the cover 23. Alternatively, a plurality of through holes may be provided on the positioning flange 241 to maintain the fluid communication of the second filtered fluid channel F2. The pipe portion 232 of the cover 23 forms a second water outlet pipe, and the upper end portion of the pipe portion 232 forms a second water outlet 16. An annular space formed between an inlet 233 of the base portion 231 and the central cylindrical portion 226 forms a fluid outlet of the accommodation space C1. In addition, in order to prevent the solid particles of the third filtration medium 33 from entering the second filtered fluid channel F2 along with the filtered water, the inner housing 22 is further provided with a first blocking member 25. The first blocking member 25 is provided at the fluid outlet of the accommodation space C1 of the inner housing 22, surrounds the central cylindrical portion 226, is sandwiched between the protruding ribs 2231 of the first annular wall portion 223 (see FIG. 4 and FIG. 5) and the base portion 231 of the cover 23, covers the fluid outlet (namely, the annular space between the inlet 233 of the base portion 231 and the central cylindrical portion 226) of the accommodation space C1, and prevents the solid particles of the third filtration medium 33 from entering the second filtered fluid channel F2. In the example shown in the drawings, the first blocking member 25 is a porous pad made of a porous material, and is configured to allow the fluid to flow through the first blocking member but to prevent the solid particles of the third filtration medium 33 from flowing through the first blocking member.

The main structure of the filter cartridge 1 is described above. A process in which a filter provided with the filter cartridge 1 filters raw water is described below with reference to FIG. 7 and FIG. 8.

As shown by the line K1 with an arrowhead in FIG. 7 and FIG. 8, the raw water enters the raw water channel P1 by means of the water inlet 14. The raw water in the raw water channel P1 is sequentially filtered by the first filtration medium 31 and the second filtration medium 32, as shown by a line K2 with an arrowhead in FIG. 7 and FIG. 8. First filtered water (the first filtered fluid) filtered by the first filtration medium 31 and the second filtration medium 32 enters the first filtered fluid channel F1. The first filtered fluid channel F1 is constantly in fluid communication with the first water outlet 15. When a water faucet (not shown) of the filter mounted with the filter cartridge 1 is operated to cause the first water outlet 15 to be in communication with a water outlet end of the water faucet, the first filtered water in the first filtered fluid channel F1 flows to the internal channel V1 in the central cylindrical portion 226 by means of the central through hole 425 of the mounting member 42, flows into the first water outlet pipe 24, flows out of the filter cartridge 1 by means of the first water outlet 15, as shown by a line K3 with an arrowhead in FIG. 7 and FIG. 8, and flows to the water outlet end of the water faucet for use. When the water faucet (not shown) of the filter mounted with the filter cartridge 1 is operated to cause the second water outlet 16 to be in communication with the water outlet end of the water faucet, fluid pressure in the accommodation space C1 of the inner housing 22 is lower than fluid pressure in the first filtered fluid channel F1; the first filtered water in the first filtered fluid channel F1 applies on the valve plate 413 of the valve member 41 after passing through the through holes 423 of the mounting member 42; an upward force applied on the valve plate 413 by the first filtered water overcomes a downward force applied on the valve plate 413 by a fluid in the annular space V2 and a resilience force of the valve plate 413, so that the valve plate 413 moves toward the central cylindrical portion 226 and no longer blocks the through holes 423 of the mounting member 42, thereby establishing the fluid communication between the annular space V2 and the first filtered fluid channel F1 so as to cause the first filtered water in the first filtered fluid channel F1 to flow to the annular space V2 by means of the through holes 423, enter the accommodation space C1 by means of the through holes 227 on the substrate portion 222 of the inner housing 22, and be further filtered by the third filtration medium 33 provided in the accommodation space C1, as shown by a line K4 with an arrowhead in FIG. 7 and FIG. 8. Second filtered water (the second filtered fluid) further filtered by the third filtration medium 33 flows through the first blocking member 25 into the second filtered fluid channel F2 by means of the inlet 233 of the internal channel of the cover 23, flows out of the filter cartridge 1 from the second water outlet 16, and flows to the water outlet end of the water faucet for use. When the water faucet (not shown) of the filter mounted with the filter cartridge 1 is operated to interrupt communication between the second water outlet 16 and the water outlet end of the water faucet, the fluid pressure in the accommodation space C1 becomes greater than or equal to the fluid pressure in the first filtered fluid channel F1; therefore, fluid pressure in the annular space V2 in fluid communication with the accommodation space C1 is greater than or equal to the fluid pressure in the first filtered fluid channel F1, so that the valve plate 413, under the condition of the downward force of the fluid and the resilience force of the valve plate, moves away from the central cylindrical portion 226 to block the through hole 423 of the mounting member 42, interrupts fluid communication between the annular space V2 and the first filtered fluid channel F1, therefore interrupts the fluid communication between the accommodation space C1 and the first filtered fluid channel F1, and prevent the second filtered water from flowing back into the first filtered fluid channel F1 and being mixed with the first filtered water.

The filter cartridge 1 according to the first embodiment of the present disclosure and the filter having the filter cartridge 1 are described above. The filter cartridge 1 according to the first embodiment of the present disclosure is provided with a plurality of stages of filtration media. Therefore, a filter internally provided with one filter cartridge 1 can filter a fluid to different levels according to purposes of use. By providing, in the filter cartridge 1, the aforementioned valve member 41 automatically opening and closing according to the force applied by the fluid, mixing of filtered water having different levels of filtration can be completely avoided. In addition, by providing the first blocking member 25, the third filtration medium can be effectively held in the accommodation space C1, and the third filtration medium is prevented from being mixed into the filtered water, thereby ensuring quality of the filtered water. The filter cartridge 1 according to the first embodiment of the present disclosure and the filter having the filter cartridge 1 have a simple structure and a compact arrangement, thereby facilitating use of the filter under the condition of a limited mounting space.

In the aforementioned filter cartridge 1 according to the first embodiment of the present disclosure, as described above, the through holes 227 has a maximum size smaller than a particle diameter of solid particles of a third filtration medium 33 accommodated in the accommodation space C1, and the solid particles of the third filtration medium 33 do not leave the accommodation space C1 by means of the through holes 227. In addition, when the valve member 41 opens, the first filtered water in the first filtered fluid channel F1 enters the annular space V2, and flows upward from the annular space V2 into the accommodation space C1. Therefore, even if the third filtration medium 33 becomes smaller due to dissolution during use, due to such flow of the first filtered water, the third filtration medium 33 in the accommodation space C1 generally moves upward, and does not flow downward and enter the first filtered fluid channel F1. Therefore, the filtration unit 20 is provided with the first blocking member 25 to prevent the third filtration medium 33 from entering the second filtered fluid channel F2 from the fluid outlet of the accommodation space C1 along with the filtered water, and no blocking member is provided at the fluid inlet of the accommodation space C1. However, the present disclosure is not limited thereto. In another modification example of the first embodiment of the present disclosure, a second blocking member can be provided at the fluid inlet of the accommodation space C1.

Figure 9:
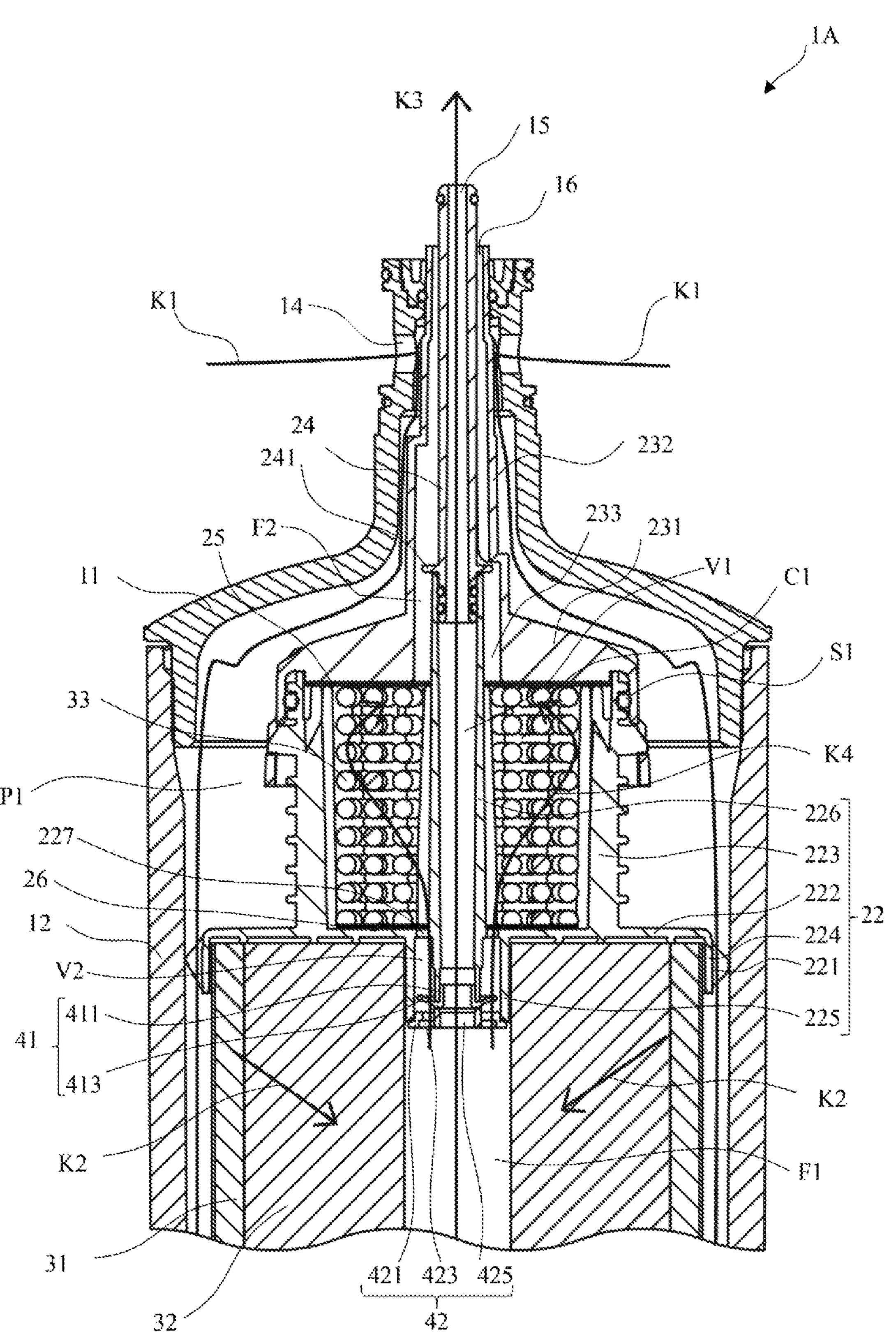
FIG. 9 shows a partial cross-sectional view of a filter cartridge of a filter according to a modification example of a first embodiment of the present disclosure.

FIG. 9 is a view similar to FIG. 8, and shows a partial sectional view of a filter cartridge 1A according to a modification example of the first embodiment of the present disclosure. The filter cartridge 1A according to the modification example has substantially the same structure as the filter cartridge 1 according to the first embodiment of the present disclosure, and the difference only lies in that a second blocking member 26 is further provided. Therefore, in the accompanying drawings and the following, the same components are represented by the same reference numerals, and the corresponding descriptions are omitted. The following will mainly describe differences between the filter cartridge 1A and the filter cartridge 1.

As shown in FIG. 9, the second blocking member 26 is provided at the bottom of the accommodation space C1 of the inner housing 22, is located on the substrate portion 222 of the inner housing 22, and blocks the through holes 227 (namely, the fluid inlet of the accommodation space C1) of the substrate portion 222. The second blocking member 26 is configured to allow the fluid to flow through the second blocking member, but to prevent the solid particles of the third filtration medium 33 from flowing through the second blocking member. The second blocking member 26 may be made of a porous material, and pores of the porous material are far smaller than the through holes 227 of the substrate portion 222. By providing the second blocking member 26, the solid particles of the third filtration medium 33 in the accommodation space C1 of the inner housing 22 can be prevented from entering the annular space V2 from the through holes 227 of the substrate portion 222, thereby preventing the solid particles of the third filtration medium 33 from being mixed into the first filtered water in the first filtered fluid channel F1, and preventing the solid particles of the third filtration medium 33 from blocking the annular space V2.

The raw water entering the raw water channel P1 by means of the water inlet 14 is sequentially filtered by the first filtration medium 31 and the second filtration medium 33, as shown by a line K2 with an arrowhead in FIG. 9. The first filtered water filtered by the first filtration medium 31 and the second filtration medium 32 enters the first filtered fluid channel F1 in the second filtration medium 32. When a water faucet (not shown) of the filter mounted with the filter cartridge 1A is operated to cause the first water outlet 15 to be in communication with a water outlet end of the water faucet, the first filtered water in the first filtered fluid channel F1 flows to the internal channel V1 in the central cylindrical portion 226 by means of the central through hole 425 of the mounting member 42, flows into the first water outlet pipe 24, flows out of the filter cartridge 1A by means of the first water outlet 15, as shown by a line K3 with an arrowhead in FIG. 9, and flows to the water outlet end of the water faucet for use. When the water faucet (not shown) of the filter mounted with the filter cartridge 1A is operated to cause the second water outlet 16 to be in communication with the water outlet end of the water faucet, fluid pressure in the accommodation space C1 of the inner housing 22 is lower than fluid pressure in the first filtered fluid channel F1; the first filtered water in the first filtered fluid channel F1 passes through the through holes 423 of the mounting member 42 and applies on the valve plate 413 of the valve member 41; an upward force applied on the valve plate 413 by the first filtered water overcomes a downward force applied on the valve plate 413 by a fluid in the annular space V2 and a resilience force of the valve plate 413, so that the valve plate 413 moves toward the central cylindrical portion 226 and no longer blocks the through holes 423 of the mounting member 42, so that the first filtered water in the first filtered fluid channel F1 flows to the annular space V2 by means of the through holes 423, flows through the through holes 227 on the substrate portion 222 of the inner housing 22, enters the accommodation space C1 by means of the second blocking member 26, and be further filtered by the third filtration medium 33 provided in the accommodation space C1, as shown by a line K4 with an arrowhead in FIG. 9. Second filtered water further filtered by the third filtration medium 33 flows through the first blocking member 25 into the second filtered fluid channel F2 by means of the inlet 233 of the internal channel of the cover 23, flows out of the filter cartridge 1A from the second water outlet 16, and flows to the water outlet end of the water faucet for use. When the water faucet (not shown) of the filter mounted with the filter cartridge 1A is operated to interrupt communication between the second water outlet 16 and the water outlet end of the water faucet, the fluid pressure in the accommodation space C1 becomes higher than or equal to the fluid pressure in the first filtered fluid channel F1, the downward force applied on the valve plate 413 of the valve member 41 by the fluid in the annular space V2 in fluid communication with the accommodation space C1 is greater than or equal to the upward force applied on the valve plate 413 by the first filtered water in the first filtered fluid channel F1; and the valve plate 413 moves away from the central cylindrical portion 226 under the condition of the resilience force of the valve plate 413 to block the through holes 423 of the mounting member 42, thereby interrupting fluid communication between the annular space V2 and the first filtered fluid channel F1 and preventing the second filtered water from entering the first filtered fluid channel F1 and being mixed with the first filtered water.

The filter cartridge 1A according to the aforementioned modification example of the first embodiment of the present disclosure and the filter provided with the filter cartridge 1A can achieve the same beneficial technical effect as the filter cartridge 1 according to the first embodiment of the present disclosure and the filter.

FIG. 10 to FIG. 21 show a filter cartridge 2 according to a second embodiment of the present disclosure. The filter cartridge 2 according to the second embodiment of the present disclosure has substantially the same structure as the filter cartridge 1 according to the first embodiment of the present disclosure, and the differences only lie in the structure of a valve member in a filtration unit of the filter cartridge 2 and the structure of a corresponding inner housing. Therefore, in the accompanying drawings and the following descriptions, the same components are represented by the same or corresponding reference numerals, and the corresponding descriptions are omitted. The following will mainly describe differences between the filter cartridge 2 and the filter cartridge 1.

Figure 10:
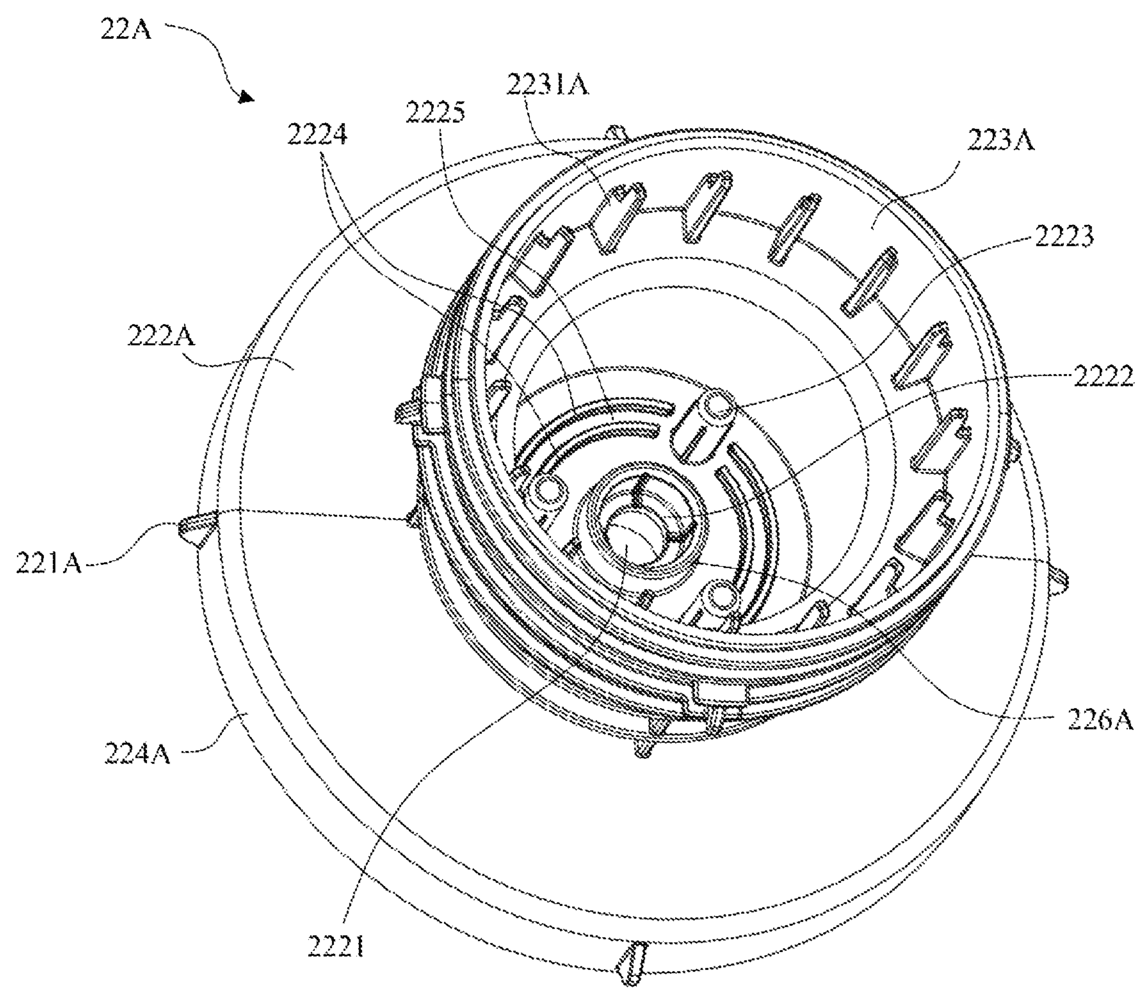
FIG. 10 shows a perspective view of an inner housing of a filter cartridge of a filter according to a second embodiment of the present disclosure.
Figure 11:
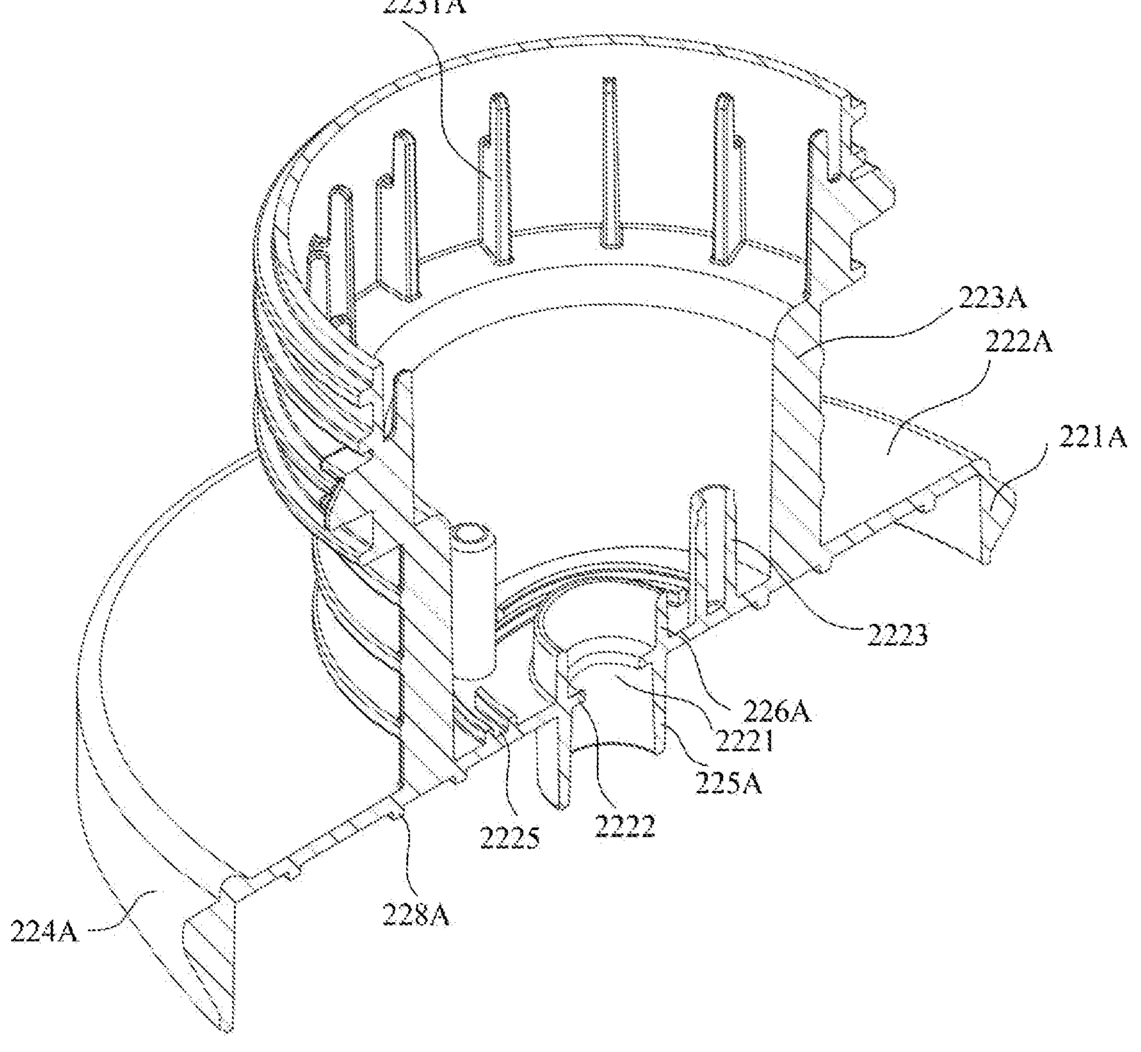
FIG. 11 shows a sectional view of the inner housing in FIG. 10.

FIG. 10 shows a perspective view of an inner housing 22A of the filtration unit of the filter cartridge 2, and FIG. 11 shows a sectional view of the inner housing 22A. As shown in FIG. 10 and FIG. 11, the inner housing 22A includes a substrate portion 222A, a first annular wall portion 223A, a second annular wall portion 225A, a flange 224A, and a central cylindrical portion 226A. The substrate portion 222A is provided with a central through hole 2221. The first annular wall portion 223A and the central cylindrical portion 226A extend from the substrate portion 222A toward the same side (an upper side in FIG. 10 and FIG. 11). The central cylindrical portion 226A surrounds the central through hole 2221 from a radial outer side of the central through hole 2221, and extends toward an upper side. A portion of the substrate portion 222A located between the central cylindrical portion 226A and the central through hole 2221 forms an inner flange 2222. The first annular wall portion 223A surrounds the central cylindrical portion 226A from the substrate portion 222A, further extends toward the upper side, is located on a radial outer side of the central cylindrical portion 226A, and is located on a radial inner side of a radial outer end portion of the substrate portion 222A. A plurality of protruding ribs 2231A circumferentially spaced apart from each other are formed on an inner circumferential surface of the first annular wall portion 223A. An upper end portion of the first annular wall portion 223A sealedly engages with a base portion 231 of a cover 23. In the example shown in FIG. 10 and FIG. 11, the first annular wall portion 223A has a stepped cylindrical shape, includes an upper portion having a relatively large diameter and a lower portion having a relatively small diameter, and forms a step portion inside, and protruding ribs 2231A are formed on an inner surface of the upper portion. However, the present disclosure is not limited thereto. In another example according to the present disclosure, the first annular wall portion 223A may also be formed to have a cylindrical shape having a uniform outer diameter and/or inner diameter, and the protruding ribs 2231A may be formed on an entire axial length of the first annular wall portion 223A. As shown in FIG. 10, a plurality of mounting columns 2223 circumferentially spaced apart from each other are further formed on an upper surface of the substrate portion 222A. Paired arc-shaped protrusions 2224 are formed between adjacent mounting columns 2223, and a mounting slot portion 2225 is defined between the paired arc-shaped protrusions 2224. The mounting columns 2223 and the arc-shaped protrusions 2224 are radially located between the first annular wall portion 223A and the central cylindrical portion 226A.

The flange 224A and the second annular wall portion 225A extend from the substrate portion 222A toward the same side (a lower side in FIG. 10 and FIG. 11). The flange 224A extends axially downward from the radial outer end portion of the substrate portion 222A. The protrusion portion 221A is provided on an outer surface of the flange 224A. The second annular wall portion 225A surrounds the central through hole 2221 of the substrate portion 222A, and extends downward. In the example shown in the drawings, in the radial direction, the second annular wall portion 225A is substantially aligned with the central cylindrical portion 226A. However, the present disclosure is not limited thereto. In another example according to the present disclosure, the second annular wall portion 225A may not be aligned with the central cylindrical portion 226A, but may be radially located on a radial inner side or the radial outer side of the central cylindrical portion 226A. For example, in an example, an inner surface of the second annular wall portion 225A may be aligned with an inner wall of the central through hole 2221. As shown in FIG. 11, a plurality of concentric annular protrusions 228A spaced apart from each other are further formed on a lower surface of the substrate portion 222A so as to hold a first filtration medium and a second filtration medium.

Figure 12:
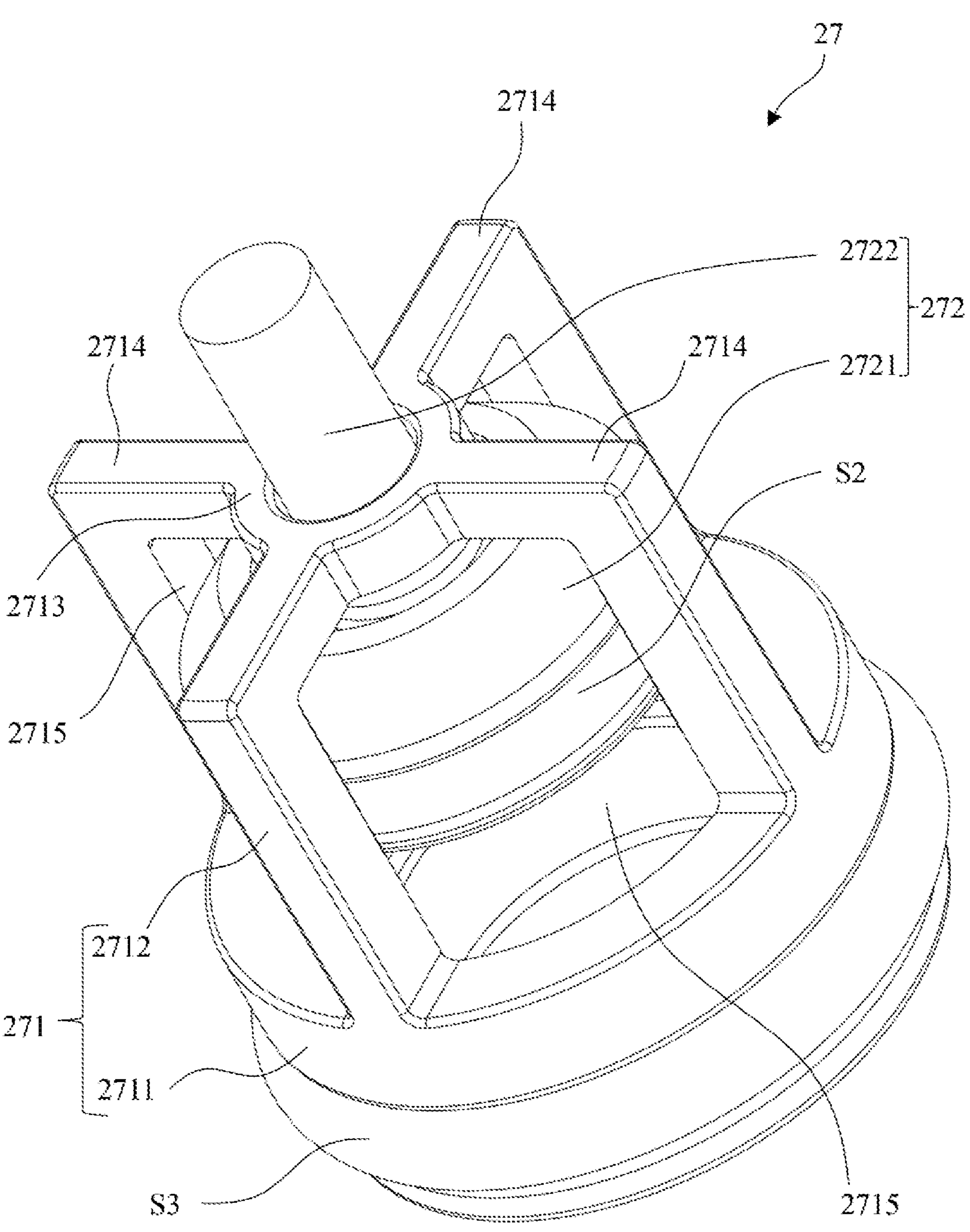
FIG. 12 and FIG. 13 show perspective views of a valve member in a filter cartridge of a filter according to a second embodiment of the present disclosure.
Figure 13:
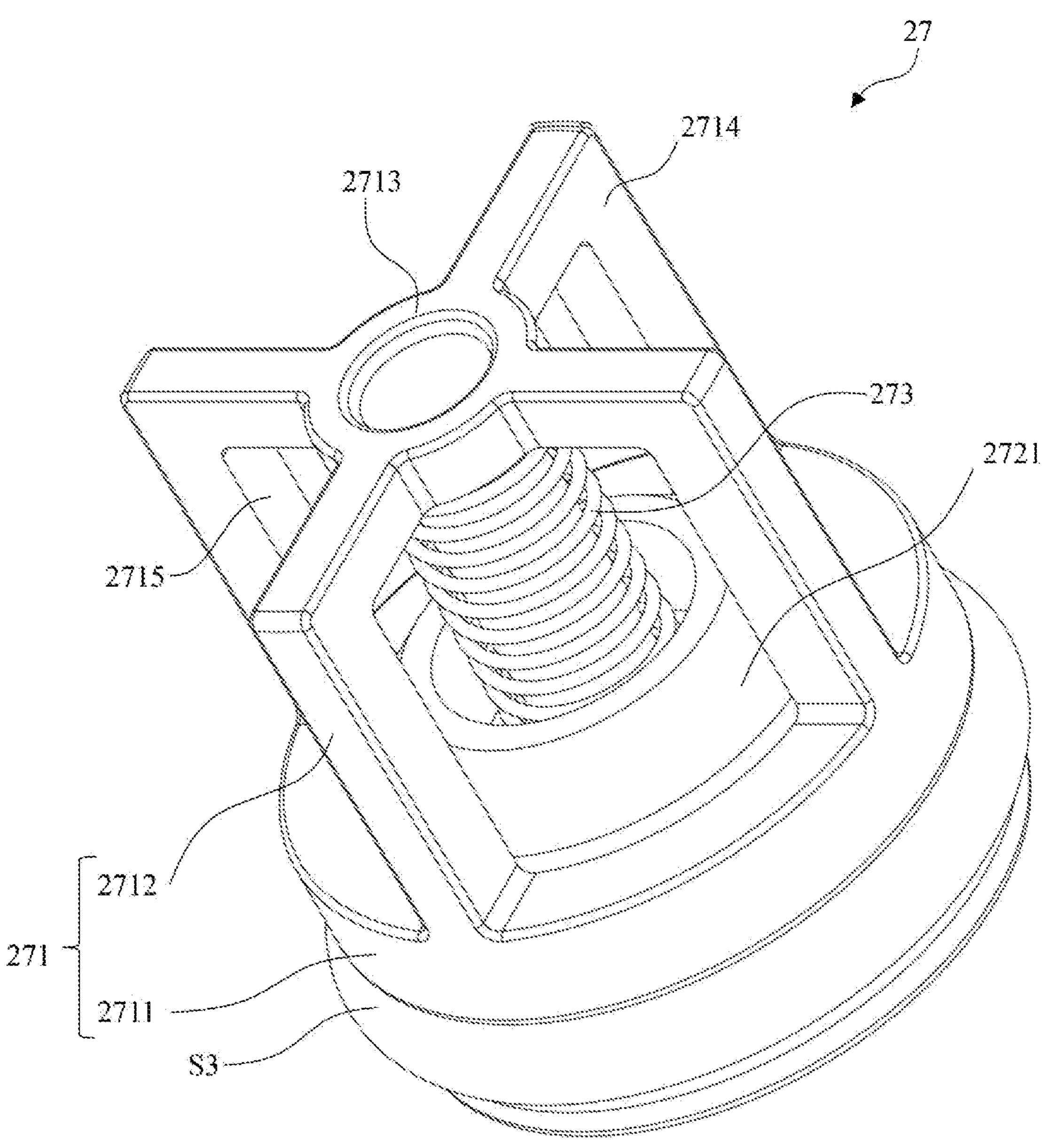

The filtration unit of the filter cartridge 2 further includes a valve member 27 mounted in the inner housing 22A. FIG. 12 and FIG. 13 show perspective views of the valve member 27. In an example shown in the drawings, the valve member 27 is configured as a piston-like one-way valve, and includes a valve seat 271 and a piston 272. The valve seat 271 includes an annular wall portion 2711 and a beam frame portion 2712. The beam frame portion 2712 includes an annular portion 2713 having a central through hole and a plurality of beams 2714 circumferentially spaced apart from each other from the annular portion 2713. Each beam 2714 has an inverted "L" shape, extends upward from an end portion (an upper end portion in FIG. 12 and FIG. 13) of the annular wall portion 2711, and extends radially inward to a radial outer wall of the annular portion 2713, thereby forming a window portion 2715 between an upper end portion of the annular wall portion 2711 and an adjacent beam 2714. The piston 272 is mounted in the valve seat 271 by means of a seal S2, and is vertically movable in the valve seat 271. The seal S2 is mounted on a circumferential outer wall of a disc-shaped portion 2721 of the piston 272. The disc-shaped portion 2721 is accommodated in the valve seat 271. A rod portion 2722 of the piston 272 is inserted into the central through hole of the annular portion 2713. An elastic element 273 is mounted on the rod portion 2722 of the piston 272. In the example shown in the drawings, the elastic element 273 is a helical compression spring, as shown in FIG. 13.

When an upward force applied on the disc-shaped portion 2721 of the piston 272 is sufficient to overcome a downward force (including but not limited to a force applied on the disc-shaped portion 2721 by the elastic element 273) applied on the disc-shaped portion 2721, the disc-shaped portion 2721 moves upward beyond an upper end of the annular wall portion 2711 and moves along the beam 2714, the valve member 27 is in an open state, and the window portion 2715 of the valve seat 271 communicates with a lower end opening of the annular wall portion 2711, as shown in FIG. 12. When the upward force applied on the disc-shaped portion 2721 of the piston 272 is not sufficient to overcome the downward force applied on the disc-shaped portion 2721, the disc-shaped portion 2721 moves downward to be accommodated in the annular wall portion 2711, sealedly engages with an inner wall of the annular wall portion 2711, the valve member 27 is in a closed state, and the communication between the window portion 2715 of the valve seat 271 and the lower end opening of the annular wall portion 2711 is interrupted by the disc-shaped portion 2721, as shown in FIG. 13. The valve member 27 may be a normally closed one-way valve. In addition, a lower end of the annular wall portion 2711 has an inner diameter smaller than an inner diameter of the upper end of the annular wall portion 2711 thereby forming a step portion T (shown only in FIGS. 16 and 17) on the inner wall of the annular wall portion 2711 to prevent the piston 272 from escaping from the valve seat 271. A circumferential outer surface of the annular wall portion 2711 is provided with an annular recess for accommodating a seal S3.

Figure 14:
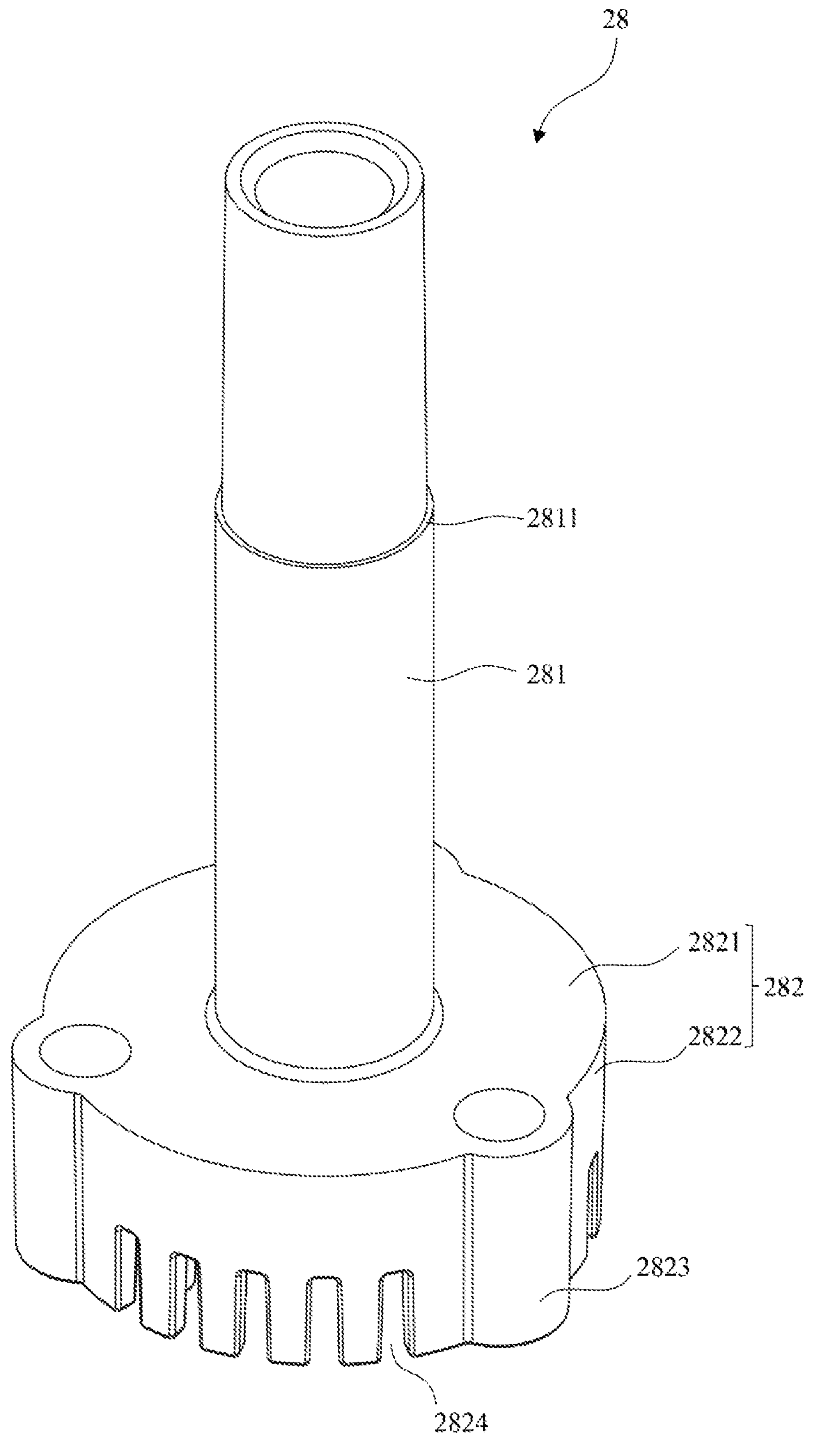
FIG. 14 shows a perspective view of a flow guide member in a filter cartridge of a filter according to a second embodiment of the present disclosure.

The filtration unit of the filter cartridge 2 further includes a flow guide member 28 mounted in the inner housing 22A. FIG. 14 shows a perspective view of the flow guide member 28. The flow guide member 28 includes a pipe portion 281 and a shielding body 282 provided at an end (a lower end in FIG. 14) of the pipe portion 281. A step portion 2811 is formed on an outer circumferential surface of the pipe portion 281. The step portion 2811 may be used to settle a first blocking member 25. The shielding body 282 includes a plate portion 2821 extending radially outward from a lower end of the pipe portion 281 and an annular wall portion 2822 extending downward from an outer circumferential edge of the plate portion 2821. A plurality of cylindrical mounting portions 2823 circumferentially spaced apart from each other are formed on the annular wall portion 2822. In the example shown in FIG. 14, three cylindrical mounting portions 2823 circumferentially spaced apart from each other are formed on the annular wall portion 2822. A plurality of open slots 2824 circumferentially spaced apart from each other are formed at an open end of the shielding body 282. The open slot 2824 is formed on a portion of the annular wall portion 2822 located between adjacent cylindrical mounting portions 2823. The open slot 2824 extends axially from a lower end portion of the annular wall portion 2822, so that when the flow guide member 28 is mounted in place in the inner housing 22A, an accommodation space C2 (see FIG. 16) outside the flow guide member 28 can communicate with a space in the shielding body 282 by means of the open slot 2824. The open slot 2824 forms a fluid inlet of the accommodation space C2. The open slot 2824 is configured to have a slot width far smaller than the particle diameter of solid particles of a third filtration medium 33 so as to prevent undissolved solid particles of the third filtration medium 33 in the accommodation space C2 from entering the shielding body 282 of the flow guide member 28 from the open slot 2824, thereby preventing the solid particles of the third filtration medium 33 from entering the pipe portion 281 or a first filtered fluid channel F1. Preferably, the filtration unit of the filter cartridge 2 is further provided with a second blocking member. The second blocking member may be made of a porous material. The porous material has a pore size far smaller than the slot width of the open slot 2824, and is configured to allow a fluid to flow through the porous material but to prevent the solid particles of the third filtration medium 33 from passing through the porous material. For example, in an example, the second blocking member may be provided around the annular wall portion 2822 of the shielding body 282, so that the second blocking member blocks the open slot 2824 on a fluid flow path.

Figure 15:
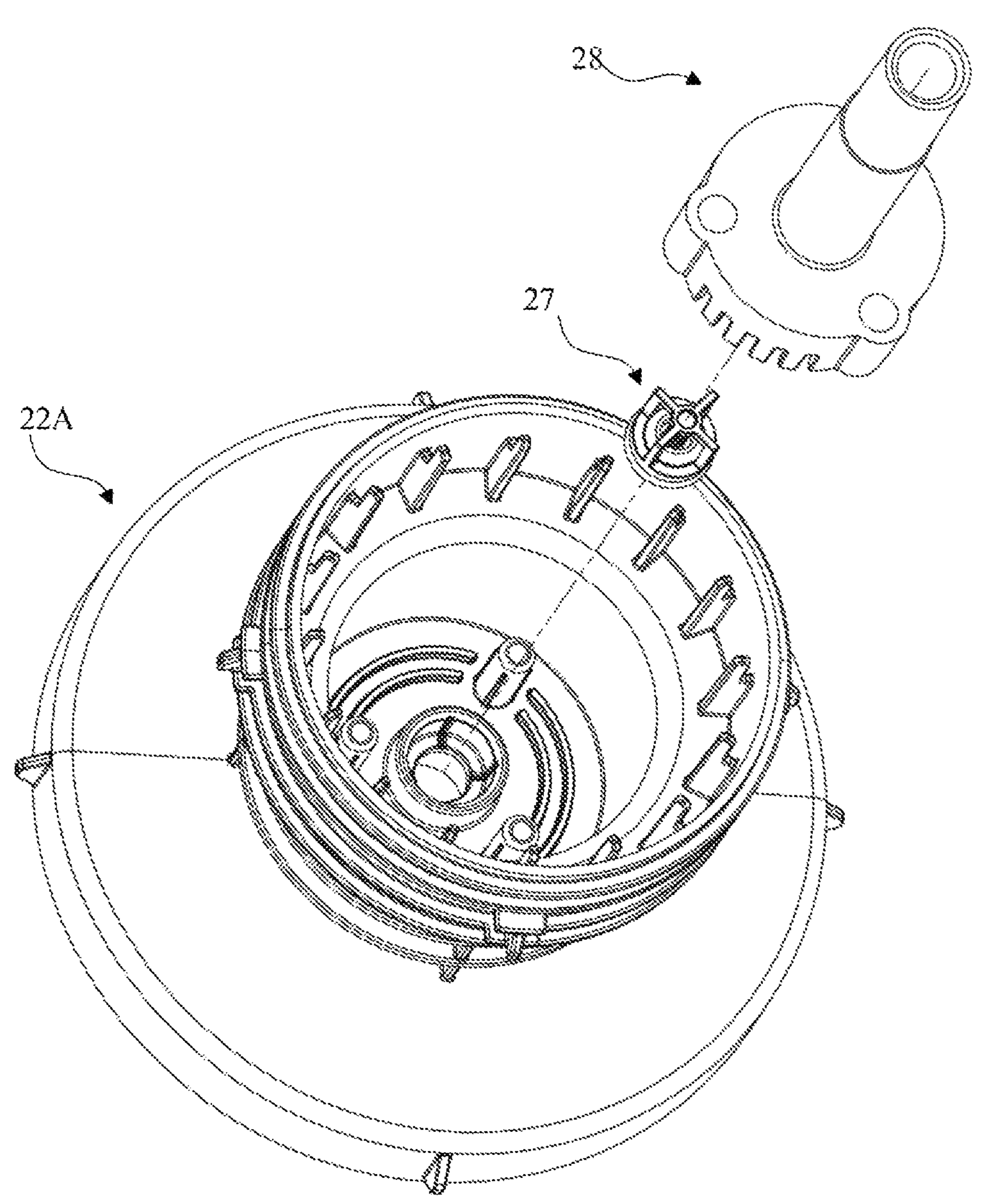
FIG. 15 shows an exploded perspective view of an inner housing, a valve member, and a flow guide member in a filter cartridge of a filter according to a second embodiment of the present disclosure.
Figure 16:
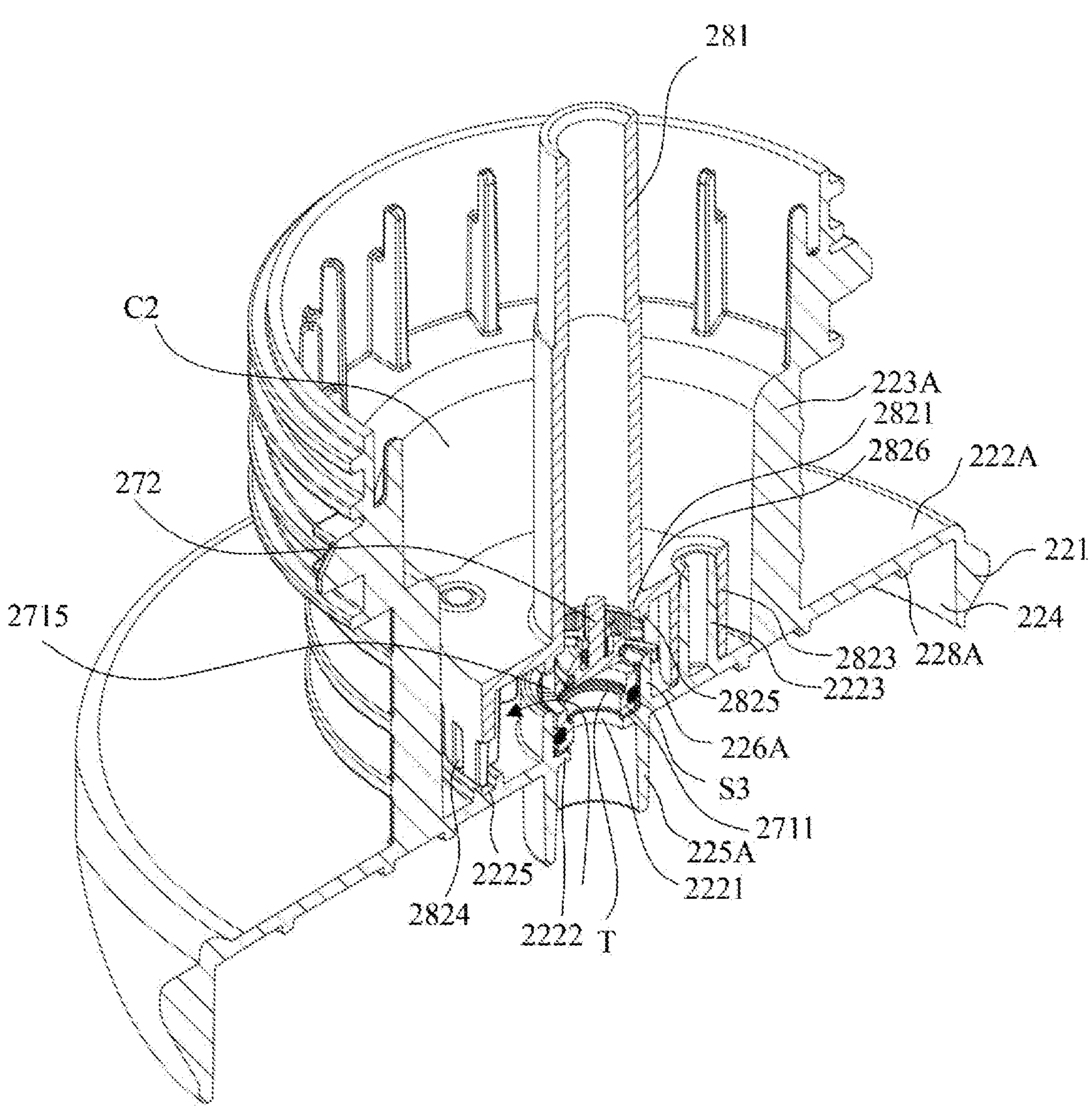
FIG. 16 and FIG. 17 show sectional views of the inner housing, the valve member, and the flow guide member in FIG. 15 assembled together, and respectively show different states of the valve member.
Figure 17:
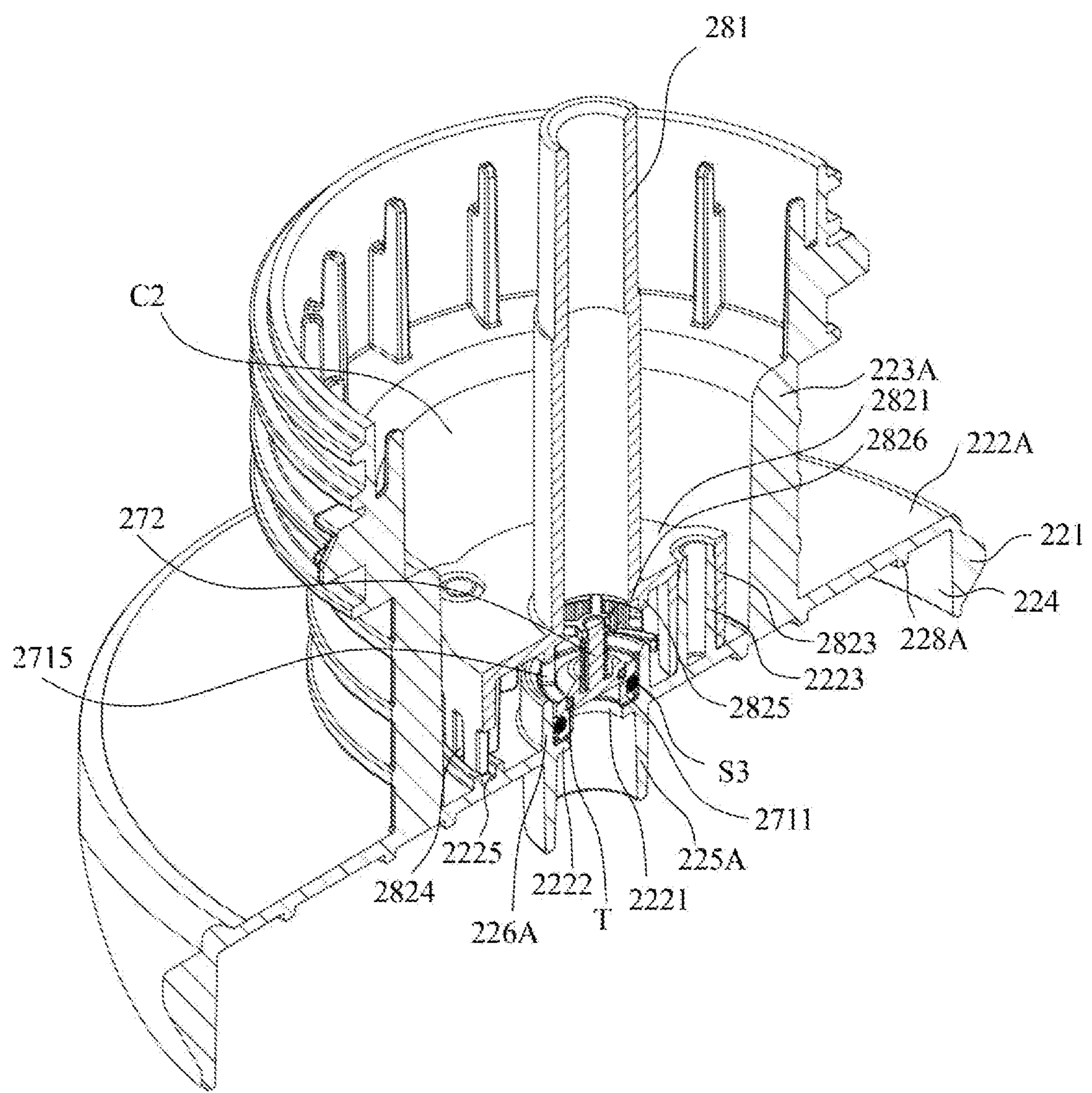

FIG. 15 shows an exploded perspective view of the inner housing 22A, the valve member 27, and the flow guide member 28. FIG. 16 and FIG. 17 show sectional views of the inner housing 22A, the valve member 27, and the flow guide member 28 assembled together, wherein FIG. 16 shows the valve member 27 in the open state, and FIG. 17 shows the valve member 27 in the closed state.

The valve member 27 is mounted in the central cylindrical portion 226A of the inner housing 22A by means of the seal S3. The lower end of the annular wall portion 2711 of the valve member 27 is settled on the inner flange 2222 in the central cylindrical portion 226A. The lower end opening of the annular wall portion 2711 is aligned with and communicates with the central through hole 2221 of the substrate portion 222A of the inner housing 22. The annular wall portion 2711 sealedly engages with an inner wall of the central cylindrical portion 226A by means of the seal S3. The window portion 2715 is at least partially exposed from an upper end of the central cylindrical portion 226A to communicate with the interior of the shielding body 282.

The flow guide member 28 is mounted to the inner housing 22A, and the open end of the shielding body 282 is mounted to the substrate portion 222A of the inner housing 22A so as to accommodate the valve member 27 in the flow guide member 28. As shown in FIG. 16 and FIG. 17, each cylindrical mounting portion 2823 of the flow guide member 28 is mounted on a corresponding mounting column 2223 of the inner housing 22A, and a portion of the annular wall portion 2822 located between adjacent cylindrical mounting portions 2823 is accommodated in the mounting slot portion 2225 of the inner housing 22A, thereby accommodating the valve member 27 in the flow guide member 28. The flow guide member 28, the first annular wall portion 223A, and the substrate portion 222A jointly define the accommodation space C2 for accommodating the third filtration medium. Most preferably, as shown in FIG. 16 and FIG. 17, a lower surface of the plate portion 2821 of the flow guide member 28 is provided with an annular protrusion 2825. The annular protrusion 2825 surrounds a lower end opening of the pipe portion 281, extends toward a lower side, and is located on a radial outer side of the lower end opening of the pipe portion 281, so that a portion of the plate portion 2821 located in the annular protrusion 2825 forms an inner flange 2826. When the flow guide member 28 is mounted to the inner housing 22A, an upper end portion of the beam frame portion 2712 of the valve seat 271 of the valve member 27 is accommodated in the annular protrusion 2825 of the flow guide member 28, and an upper end of the beam frame portion 2712 of the valve seat 271 is stopped by the inner side flange 2826 of the flow guide member 28 so as to restrict the valve member 27 to be between the substrate portion 222A of the inner housing 22A and the plate portion 2821 of the flow guide member 28. The annular protrusion 2825 and the central cylindrical portion 226A of the inner housing 22A are substantially axially aligned, but are spaced apart from each other, so that the window portion 2715 of the valve member 27 is at least partially exposed instead of being completely blocked by the annular protrusion 2825 or the central cylindrical portion 226A.

When a force applied on the disc-shaped portion 2721 of the piston 272 of the valve member 27 by a fluid flowing from a lower end opening of the second annular wall portion 225A of the inner housing 22A is sufficient to overcome a downward force (a force applied on the disc-shaped portion 2721 by the elastic element 273 and a fluid in the shielding body 282) applied on the disc-shaped portion 2721, the piston 272 moves upward to a position above the upper end portion of the annular wall portion 2711 of the valve seat 271 and moves along the beam frame portion 2712, and the valve member 27 is in the open state, as shown in FIG. 16. In this state, the window portion 2715 communicates with the lower end opening of the second annular wall portion 225A. Therefore, as shown by a line with an arrowhead in FIG. 16, the lower end opening of the second annular wall portion 225A can communicate with a space between the shielding body 282 of the flow guide member 28 and the central cylindrical portion 226A by means of the window portion 2715 of the valve member 27 so as to communicate with the accommodation space C2 by means of the open slot 2824 of the shielding body 282.

When the force applied on the disc-shaped portion 2721 of the piston 272 of the valve member 27 by the fluid flowing from the lower end opening of the second annular wall portion 225A of the inner housing 22A is not sufficient to overcome the downward force applied on the disc-shaped portion 2721 of the piston 272, the piston 272 moves downward and is settled on the step portion T in the annular wall portion 2711 of the valve seat 271, and the valve member 27 is in the closed state, as shown in FIG. 17. In this state, the communication between the lower end opening of the second annular wall portion 225A and the window portion 2715 is interrupted by the disc-shaped portion 2721 of the piston 272. Therefore, the communication between the lower end opening of the second annular wall portion 225A and the accommodation space C2 is also interrupted.

Figure 18:
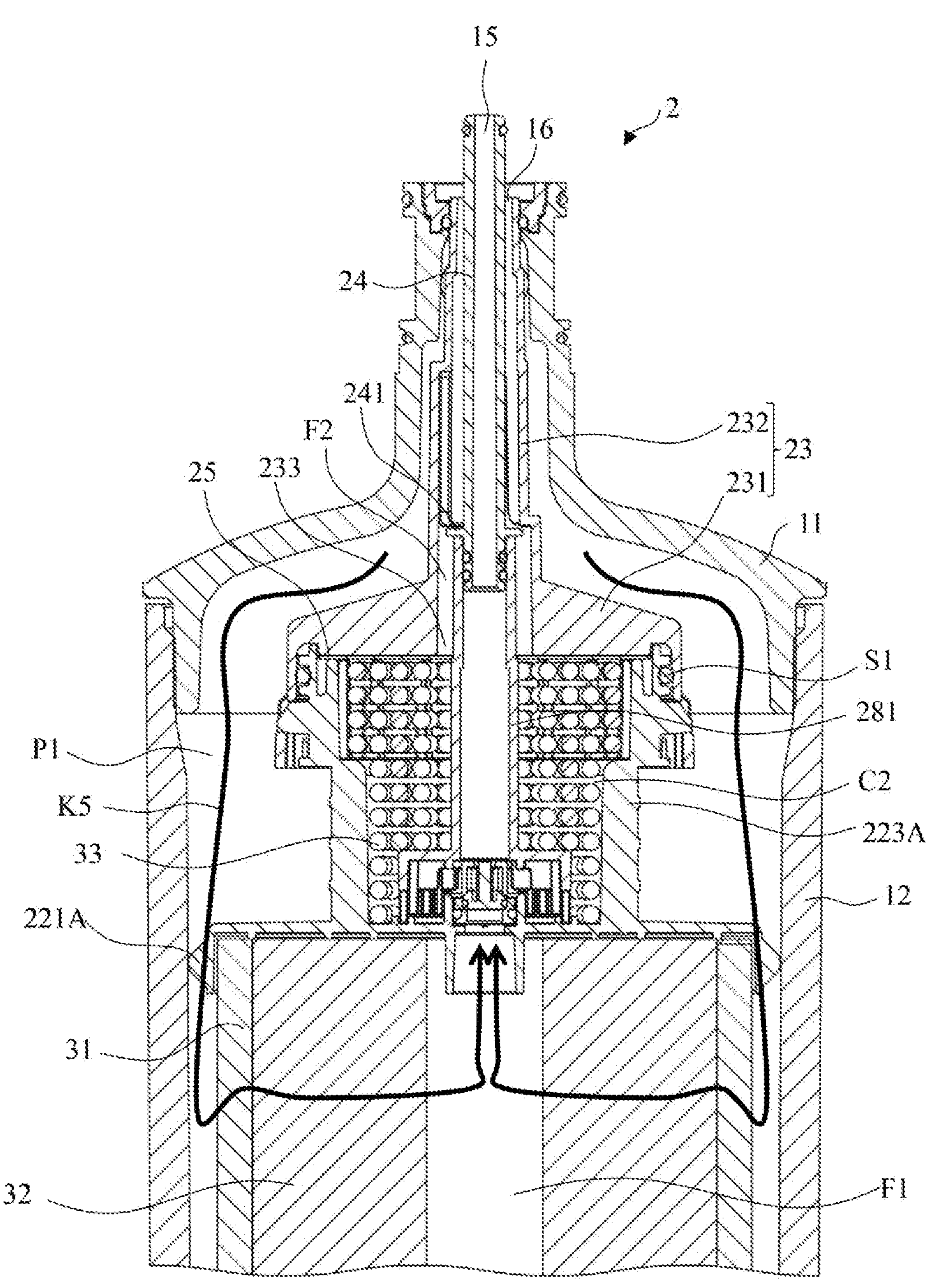
FIG. 18 shows a partial cross-sectional view of a filter cartridge of a filter according to a second embodiment of the present disclosure, and shows that a valve member is in a closed state.
Figure 19:
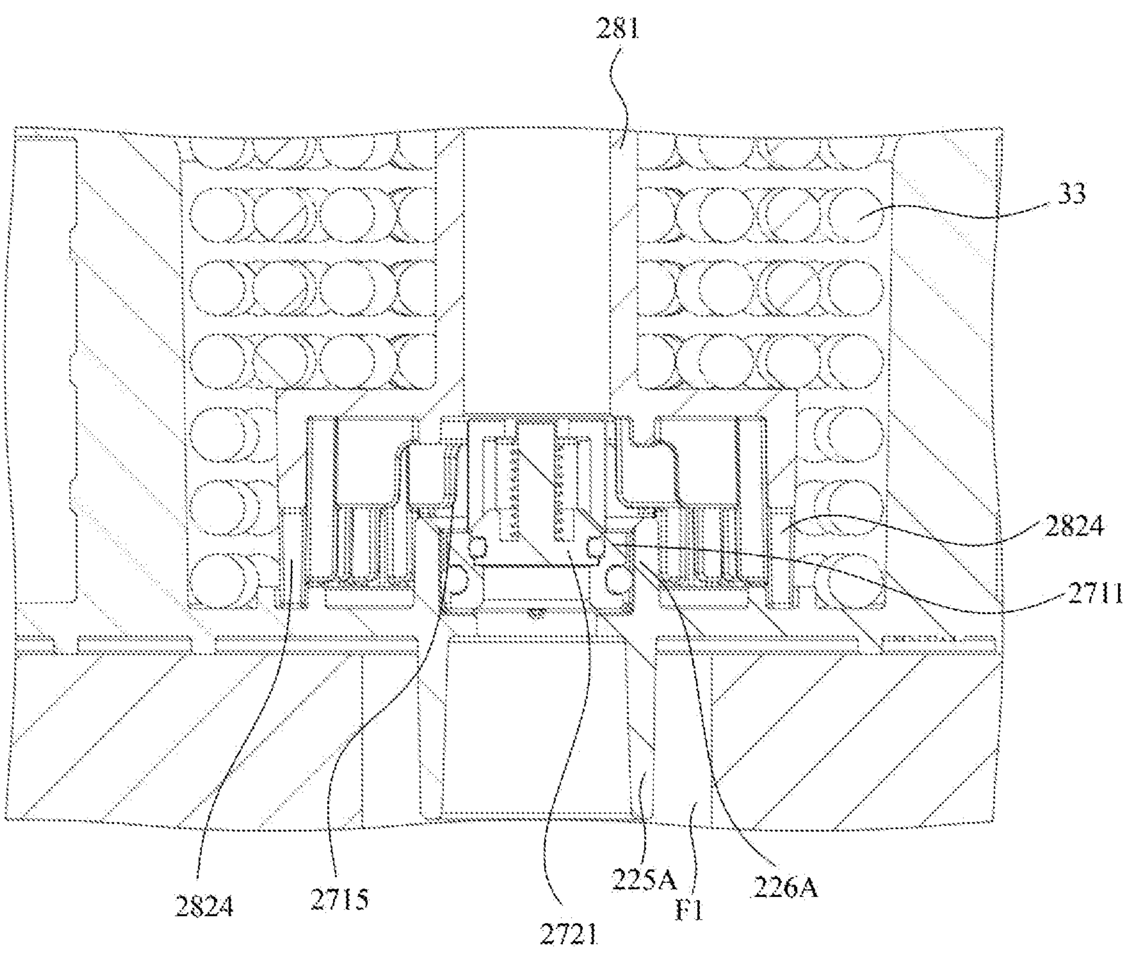
FIG. 19 is a partially enlarged view of FIG. 18.
Figure 20:
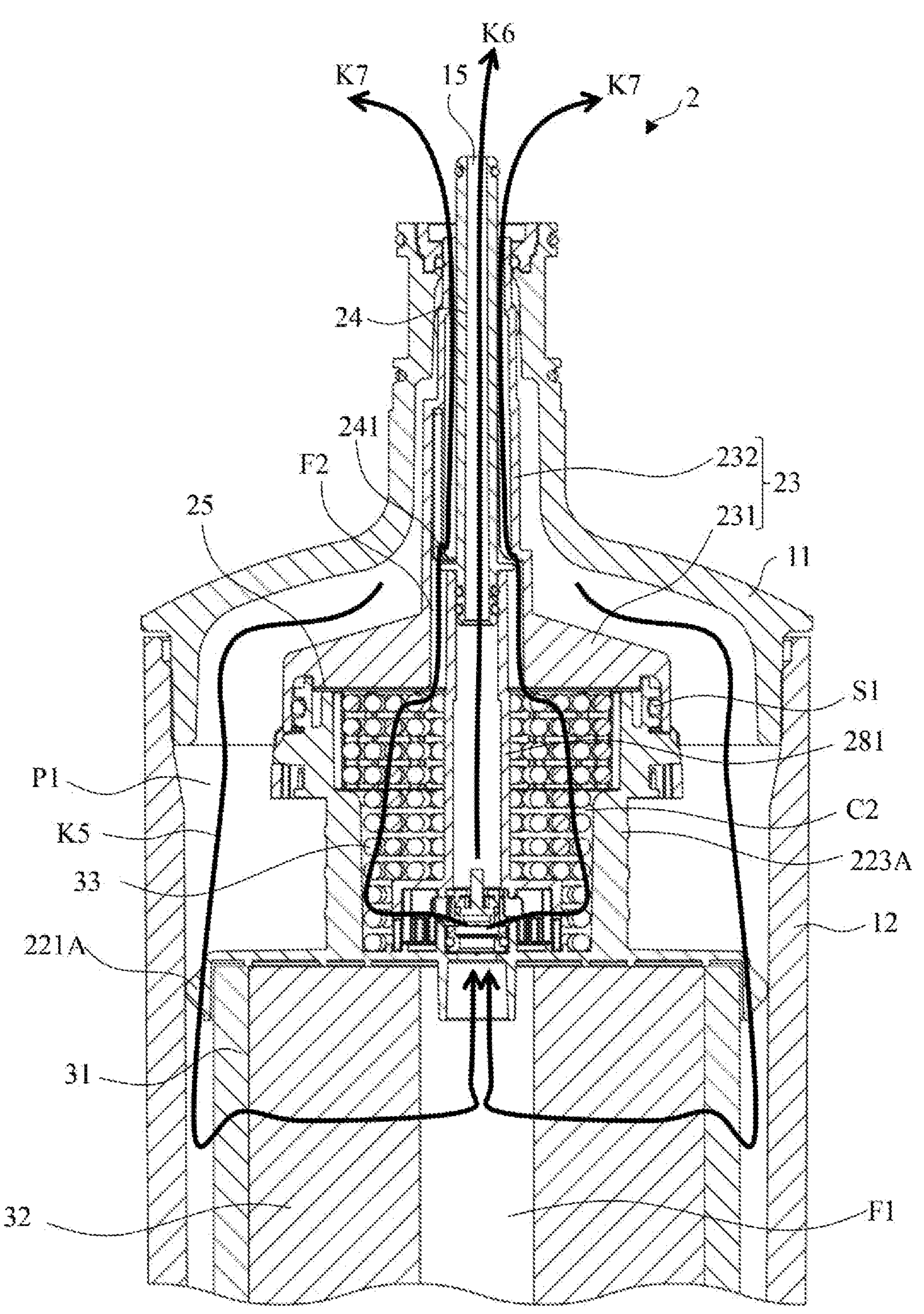
FIG. 20 shows a partial cross-sectional view of a filter cartridge of a filter according to a second embodiment of the present disclosure, and shows that a valve member is in an open state.
Figure 21:
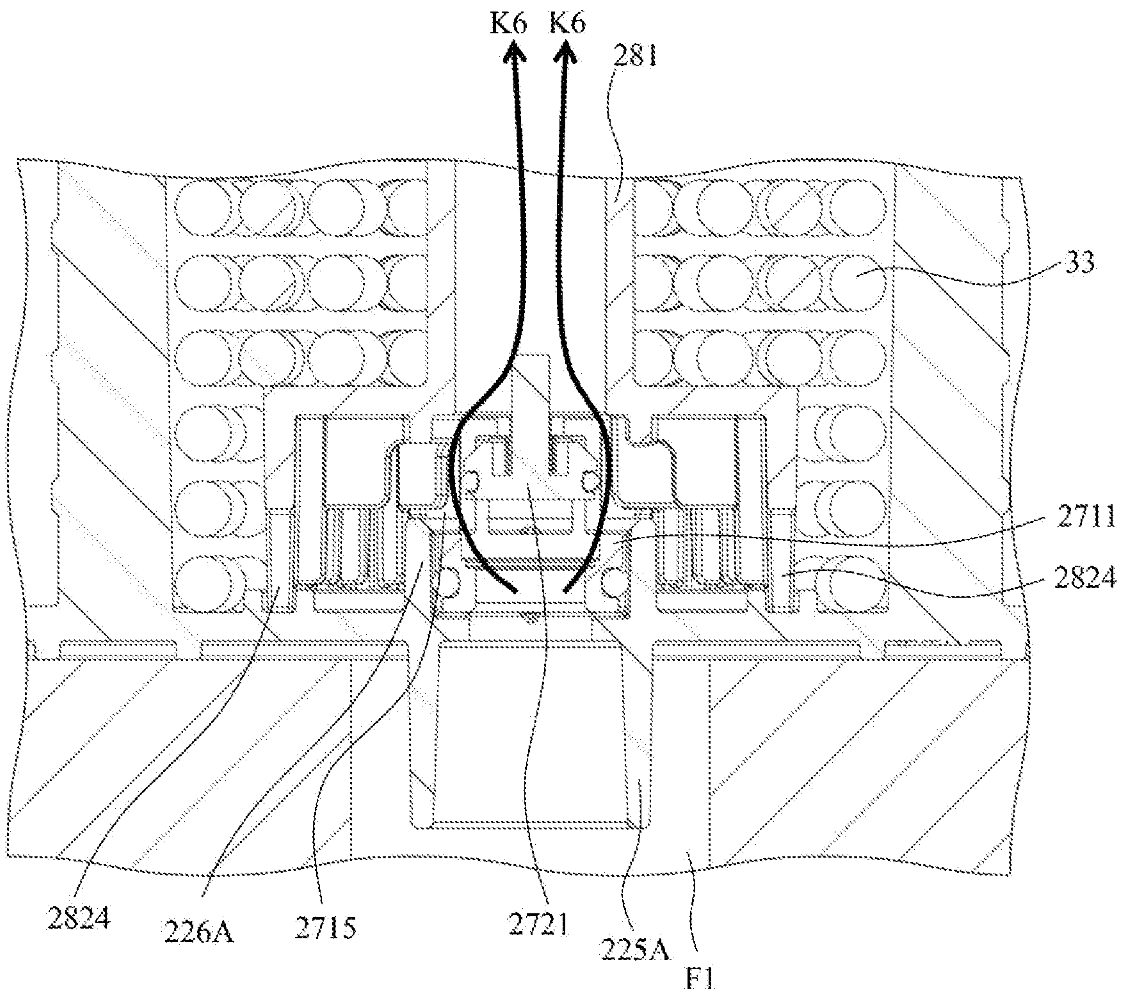
FIG. 21 to FIG. 23 are partially enlarged views of FIG. 20, and respectively show flowing of filtered water in different states of use.
Figure 22:
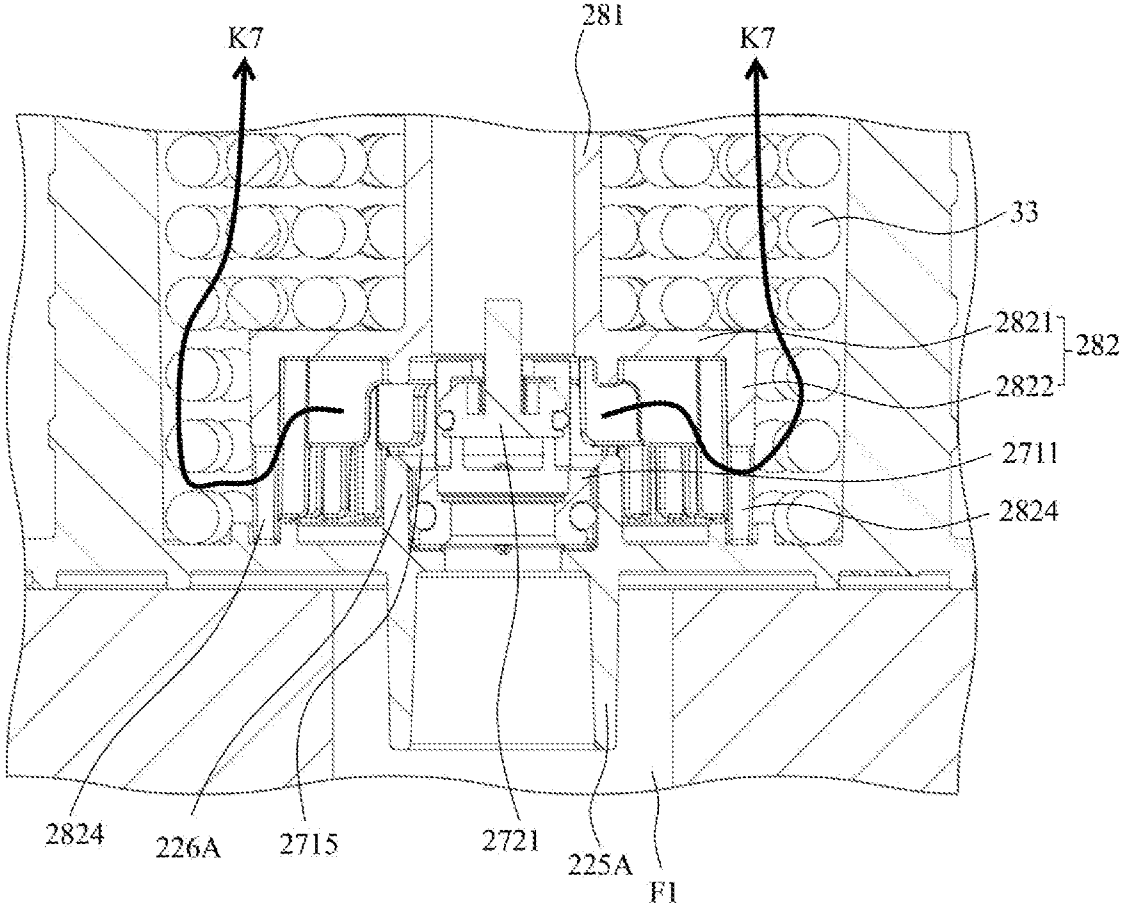
Figure 23:
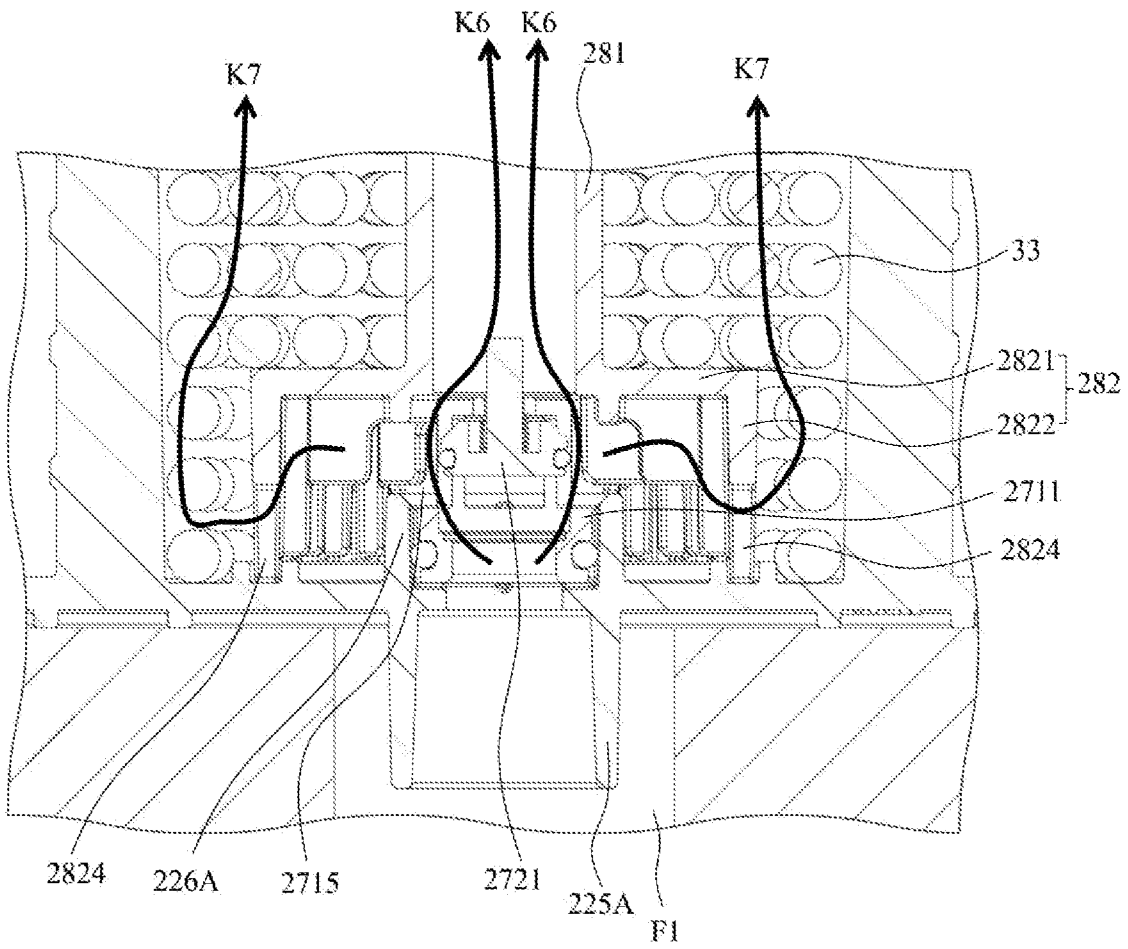

FIG. 18 to FIG. 23 show partial cross-sectional views of the filter cartridge 2, wherein FIG. 18 shows that the valve member 27 is in the closed state, FIG. 19 shows a partially enlarged view of FIG. 18, FIG. 20 shows that the valve member 27 is in the open state, and FIG. 21 to FIG. 23 show partially enlarged views of FIG. 20, and respectively show flow of filtered water in different states of use.

As shown in FIG. 18 to FIG. 23, the filtration unit of the filter cartridge 2 is mounted in a filter cartridge housing portion, and an annular raw water channel P1 is formed between the filter cartridge housing portion and the filtration unit. The base portion 231 of the cover 23 is sealedly mounted to the upper end portion of the first annular wall portion 223A of the inner housing 22A by means of a seal S1 so as to prevent the raw water entering the raw water channel P1 from entering the inner housing 22A and being mixed into the filtered water filtered by the filtration medium. An upper end portion of the pipe portion 281 of the flow guide member 28 is inserted into an internal channel of the cover 23. A first water outlet pipe 24 is connected to the upper end portion of the pipe portion 281 of the flow guide member 28. A positioning flange 241 is settled on an upper end of the pipe portion 281 of the flow guide member 28. An upper end portion of the first water outlet pipe 24 forms the first water outlet 15. A pipe portion 232 of the cover 23 is inserted into a filter cartridge housing top cover 11, and extends out of the filter cartridge housing top cover 11. A space between an inner wall of the internal channel of the cover 23 and the pipe portion 281 of the flow guide member 28 and the first water outlet pipe 24 form an annular second filtered fluid channel F2. The pipe portion 232 of the cover 23 forms a second water outlet pipe, and the upper end portion of the pipe portion 232 forms a second water outlet 16.

The filtration unit of the filter cartridge 2 is provided with a first filtration medium 31, a second filtration medium 32, and a third filtration medium 33. The first filtration medium 31 and the second filtration medium 32 form a front filtration medium, and the third filtration medium 33 forms a rear filtration medium. As shown in FIG. 18, the first filtration medium 31 is mounted around the second filtration medium 32, and is located on a radial outer side of the second filtration medium 32. The third filtration medium 33 is accommodated in the accommodation space C2. In addition, the inner housing 22A is further provided with a first blocking member 25. The first blocking member 25 is provided at a fluid outlet of the accommodation space C2 (that is, formed in an annular space between an inlet 233 of the base portion 231 and the pipe portion 281 of the flow guide member 28), and is used to prevent solid particles of the third filtration medium 33 in the accommodation space C2 from leaving the accommodation space C2 along with the filtered water from a fluid outlet of the accommodation space C2. The first blocking member 25 surrounds the pipe portion 281 of the flow guide member 28, is settled on the step portion 2811 (see FIG. 14) of the pipe portion 281 and an upper end portion of the protruding rib 2231A (see FIG. 10) of the first annular wall portion 223A of the inner housing 22A, is sandwiched between the protruding rib 2231A and the base portion 231 of the cover 23, blocks the fluid outlet of the accommodation space C2, allows a fluid to flow through the first blocking member, but prevents the solid particles of the third filtration medium 33 from flowing out of the fluid outlet of the accommodation space C2 into the second filtered fluid channel F2.

The raw water enters the raw water channel P1 in the filter cartridge 2 by means of the water inlet, and flows along the raw water channel P1. First filtered water (a first filtered fluid) filtered by the first filtration medium 31 and the second filtration medium 32 enters the first filtered fluid channel F1, as shown by a line K5 with an arrowhead in FIG. 18 and FIG. 20. When a water faucet (not shown) of a filter mounted with the filter cartridge 2 is operated to cause the first water outlet 15 and the second water outlet 16 not to be in communication with a water outlet end of the water faucet, an upward force applied on the disc-shaped portion 2721 of the piston 272 of the valve member 27 by the first filtered water in the first filtered fluid channel F1 is not sufficient to overcome a downward force applied on the disc-shaped portion 2721, the disc-shaped portion 2721 is located in the annular wall portion 2711 of the valve seat 271, the valve member 27 is in the closed state, as shown in FIG. 18 and FIG. 19, and the first water outlet 15 and the second water outlet 16 do not communicate with the first filtered fluid channel F1.

When the water faucet (not shown) of the filter mounted with the filter cartridge 2 is operated to cause one or both of the first water outlet 15 and the second water outlet 16 to be in communication with the water outlet end of the water faucet, the upward force applied on the disc-shaped portion 2721 of the piston 272 of the valve member 27 by the first filtered water in the first filtered fluid channel F1 overcomes the downward force applied on the disc-shaped portion 2721, so that the disc-shaped portion 2721 moves upward, and the valve member 27 is in the open state, as shown in FIG. 20 to FIG. 23.

When the water outlet end communicates only with the first water outlet 15, the first filtered water in the first filtered fluid channel F1 enters the valve member 27 from a lower end opening of the valve seat of the valve member 27, flows through the window portion 2715, enters the interior of the shielding body 282 of the flow guide member 28, flows into the first water outlet pipe 24 from the pipe portion 281 of the flow guide member 28, and flows out of the first water outlet 15, as shown by an arrow K6 in FIG. 20. In this state, the filtered water flowing out of the filter cartridge 2 is the first filtered water filtered by the first filtration medium 31 and the second filtration medium 32.

When the water outlet end communicates only with the second water outlet 16, the first filtered water in the first filtered fluid channel F1 enters the valve member 27 from the lower end opening of the valve seat of the valve member 27, flows through the window portion 2715, enters the interior of the shielding body 282 of the flow guide member 28, enters the accommodation space C2 by means of the open slot 2824 on the shielding body 282, as shown by an arrow K7 in FIG. 22, and the second filtered water filtered by the third filtration medium 33 in the accommodation space C2 enters the second filtered fluid channel F2, and flows out of the second water outlet 16. In this state, the filtered water flowing out of the filter cartridge 2 is the second filtered water filtered by the first filtration medium 31, the second filtration medium 32, and the third filtration medium 33.

When the water outlet end communicates with both the first water outlet 15 and the second water outlet 16, the aforementioned first filtered water and second filtered water respectively flow out from the first water outlet 15 and the second water outlet 16, as shown by arrows K6 and K7 in FIG. 23.

Once the water outlet end closes and does not communicate with the first water outlet 15 and the second water outlet 16, the disc-shaped portion 2721 moves downward into the annular wall portion 2711 of the valve seat 271, and the valve member 27 is again in the closed state shown in FIG. 18 and FIG. 19.

In the filter cartridge 2 according to the second embodiment of the present disclosure, the accommodation space C2 communicates with the space in the flow guide member 28 by means of the open slot 2824 on the flow guide member 28, and therefore, communicates with the first water outlet pipe 24 to a certain extent. As the use of filter cartridge 2, even though a small amount of the third filtration medium 33 is dissolved in the filtered water and enters the flow guide member 28, once the first water outlet 15 communicates with the water outlet end, the small amount of the third filtration medium 33 dissolved in the flow guide member 28 would be quickly diluted. In addition, since the third filtration medium 33 is not provided on a flow channel of first outflow water (namely, the water flowing out of the first water outlet), as the first filtered water continuously flows, the third filtration medium is no longer released into the first outflow water.

The filter cartridge 2 according to the second embodiment of the present disclosure and the filter provided with the filter cartridge 2 can achieve the same beneficial technical effect as the filter cartridge 1 according to the first embodiment of the present disclosure and the filter, and provide, as desired, filtered water filtered to different levels by means of simple and compact structures, so as to meet different requirements on quality of the filtered water.

By means of the application of the present disclosure in the water purifier, the above descriptions illustrate the filter cartridges and the filters according to the preferred embodiments of the present disclosure. However, the present disclosure is not limited to the above preferred embodiments. Modifications can be made to the above preferred embodiments on the basis of the ideas of the present disclosure, and these modifications all fall within the scope of the present disclosure.

In the above preferred embodiments, the first water outlet pipe 24 is sealedly connected to the central cylindrical portion 226 of the inner housing 22, or is sealedly connected to the pipe portion 281 of the flow guide member 28 in the inner housing 22A. However, the present disclosure is not limited thereto. In another embodiment according to the present disclosure, the central cylindrical portion 226 and/or the flow guide member 28 may be integrally formed with the first water outlet pipe 24. For example, in an example of the filter cartridge according to the first embodiment of the present disclosure, the central cylindrical portion 226 can be configured to extend axially out of the pipe portion 232 of the cover 23 so as to integrally form the first water outlet pipe. In another example of the second embodiment according to the present disclosure, the pipe portion 281 of the flow guide member 28 can be configured to extend axially out of the pipe portion 232 of the cover 23 so as to integrally form the first water outlet pipe.

In the aforementioned preferred embodiment, the lower surface of the substrate portion of the inner housing is provided with an annular protrusion (for example, the annular protrusion 228 on the substrate portion 222 of the inner housing 22 and the annular protrusion 228A on the substrate portion 222A of the inner housing 22A) so as to better hold the filtration medium. However, the present disclosure is not limited thereto. In another embodiment according to the present disclosure, the lower surface of the substrate portion of the inner housing may not be provided with any annular protrusion, but may be a substantially flat surface.

In the aforementioned preferred embodiment, the first blocking member 25 is a porous pad provided at the fluid outlet of the accommodation space of the inner housing. However, the present disclosure is not limited thereto. In another example according to the present disclosure, the first blocking member 25 can have other appropriate structures as long as the first blocking member can prevent the solid particles of the third filtration medium 33 from flowing into the second filtered fluid channel F2.

In the aforementioned preferred embodiment, the filtration unit 20 is provided with a first filtration medium 31, a second filtration medium 32, and a third filtration medium 33, wherein the first filtration medium 31 and the second filtration medium 32 form the front filtration medium of the filtration unit 20, and the third filtration medium forms the rear filtration medium of the filtration unit 20. However, the present disclosure is not limited thereto. In another example according to the present disclosure, the front filtration medium and/or the rear filtration medium of the filtration unit 20 can be provided with more or less stages of filtration media. In an example, the rear filtration medium of the filtration unit 20 can be configured to include two stages of filtration media, and another stage of filtration medium can be additionally provided downstream or upstream of the third filtration medium. Alternatively, in another example, the front filtration medium of the filtration unit 20 can include only one of the first filtration medium 31 and the second filtration medium 32. In addition, the types of the first filtration medium 31, the second filtration medium 32, and the third filtration medium 33 are not limited to the types selected in the aforementioned preferred embodiments, and a suitable type of filtration medium can be selected according to impurities needed to be filtered out.

Herein, the exemplary embodiments of the present disclosure are described in detail with reference to the application of the filter cartridge disclosure and the filter having the filter cartridge according to the present in the field of filtration of drinking water. However, it should be understood that the present disclosure is not limited to the specific embodiments described and illustrated above in detail. Those skilled in the art can make various variations and variants of the present disclosure without departing from the gist and scope of the present disclosure. All these variations and variants fall within the scope of the present disclosure. In addition, all members described herein can be replaced with other technically equivalent members.

The invention claimed is:

1. A filter cartridge (1, 1A, 2), the filter cartridge (1, 1A, 2) comprising:

a filter cartridge housing portion (10), the filter cartridge housing portion (10) being provided with a water inlet (14); and a filtration unit (20), the filtration unit (20) being provided in the filter cartridge housing portion (10);

the filter cartridge being characterized in that the filtration unit (20) is provided with a front filtration medium and a rear filtration medium; the filtration unit (20) is configured to cause raw water flowing into the filter cartridge housing portion (10) by means of the water inlet (14) to be filtered by the front filtration medium to obtain a first filtered fluid; and the first filtered fluid selectively flows toward a first water outlet (15), and/or flows toward a second water outlet (16) after being filtered by the rear filtration medium;

wherein the filtration unit (20) comprises a hollow cover (23), an inner housing (22, 22A), and a mounting base (21); the cover (23) is sealedly connected to the inner housing (22, 22A);

the front filtration medium is mounted between the inner housing (22, 22A) and the mounting base (21); a first filtered fluid channel (F1) is formed in the filtration unit (20); the first filtered fluid filtered by the front filtration medium enters the first filtered fluid channel (F1);

an accommodation space (C1, C2) is formed in the inner housing (22, 22A); the rear filtration medium is provided in the accommodation space (C1, C2); the inner housing (22, 22A) is configured so that the accommodation space (C1, C2) is located downstream of the first filtered fluid channel (F1), in fluid communication with the second water outlet (16), and selectively in fluid communication with the first filtered fluid channel (F1); and wherein the filtration unit (20) further comprises a first blocking member (25); the first blocking member (25) is provided at a fluid outlet of the accommodation space (C1, C2), and is configured to prevent the rear filtration medium from leaving the accommodation space (C1, C2) from the fluid outlet of the accommodation space (C1, C2), but to allow the first filtered fluid to flow through the first blocking member (25) toward the second water outlet (16) after being filtered by the rear filtration medium.

2. The filter cartridge (1, 1A, 2) according to claim 1, wherein the filtration unit (20) further comprises a valve member (41, 27) provided in the inner housing (22, 22A), and the valve member (41, 27) is configured to selectively open or close according to fluid pressure in the filter cartridge (1, 1A, 2) so that one or both of the first water outlet (15) and the second water outlet (16) are selectively in fluid communication with the first filtered fluid channel (F1).

3. The filter cartridge (1, 1A) according to claim 2, wherein the first water outlet (15) is in fluid communication with the first filtered fluid channel (F1), and the valve member (41) is configured to selectively cause the second water outlet (16) to be in fluid communication with the first filtered fluid channel (F1).

4. The filter cartridge (2) according to claim 2, wherein when the valve member (27) opens, the first water outlet (15) and the second water outlet (16) are both in fluid communication with the first filtered fluid channel (F1), and when the valve member (27) closes, the first water outlet (15) and the second water outlet (16) are not in fluid communication with the first filtered fluid channel (F1).

5. The filter cartridge (1, 1A, 2) according to claim 1, wherein the filtration unit (20) further comprises a second blocking member (26), and the second blocking member (26) is provided at a fluid inlet of the accommodation space (C1, C2), and is configured to prevent the rear filtration medium from leaving the accommodation space (C1, C2) from the fluid inlet of the accommodation space (C1, C2), but to allow the first filtered fluid to enter the accommodation space (C1, C2).

6. The filter cartridge (1, 1A, 2) according to claim 3, wherein the inner;

housing (22, 22A) is provided with:

a substrate portion (222, 222A);

a first annular wall portion (223, 223A), the first annular wall portion (223, 223A) extending axially from the substrate portion (222, 222A) toward a first side, and the first annular wall portion (223, 223A) being sealedly connected to the cover (23);

a second annular wall portion (225, 225A), the second annular wall portion (225, 225A) extending axially from the substrate portion (222, 222A) toward a second side opposite the first side, and the second annular wall portion (225, 225A) being inserted in the first filtered fluid channel (F1); and a central cylindrical portion (226, 226A), the central cylindrical portion (226, 226A) extending axially from the substrate portion (222, 222A) toward the first side, and being located on a radial inner side of the first annular wall portion (223, 223A).

7. The filter cartridge (1, 1A) according to claim 6, wherein the central cylindrical portion (226), the substrate portion (222), and the first annular wall portion (223) jointly define the accommodation space (C1);

the central cylindrical portion (226) further extends axially from the substrate portion (222) toward the second side into the first filtered fluid channel (F1) so as to form an annular space (V2) between the second annular wall portion (225) and the central cylindrical portion (226), the annular space (V2) is located upstream of the accommodation space (C1) and in fluid communication with the accommodation space (C1);

the valve member (41) is mounted to the central cylindrical portion (226) or the second annular wall portion (225), and the valve member (41) is configured so that a valve plate (413) of the valve member (41) selectively establishes or interrupts fluid communication between the annular space (V2) and the first filtered fluid channel (F1).

8. The filter cartridge (1, 1A) according to claim 7, wherein when fluid pressure in the accommodation space (C1) is lower than fluid pressure in the first filtered fluid channel (F1), the valve member (41) opens, and the valve plate (413) establishes the fluid communication between the annular space (V2) and the first filtered fluid channel (F1) so that the first filtered fluid in the first filtered fluid channel (F1) flows through the annular space (V2), enters the accommodation space (C1), and flows out of the second water outlet (16) after being filtered by the rear filtration medium; and when the fluid pressure in the accommodation space (C1) is higher than or equal to the fluid pressure in the first filtered fluid channel (F1), the valve plate (413) interrupts the fluid communication between the annular space (V2) and the first filtered fluid channel (F1).

9. The filter cartridge (1, 1A) according to claim 7, wherein the central cylindrical portion (226) is connected to a first water outlet pipe (24), or is integrally formed with the first water outlet pipe (24), and the first filtered fluid flows toward the second water outlet (16) by means of a second filtered fluid channel (F2) in the cover (23) after being filtered by the rear filtration medium.

10. The filter cartridge (2) according to claim 6, wherein the filter cartridge (2) further comprises a flow guide member (28), the flow guide member (28) is provided in the inner housing (22A); the flow guide member (28), the substrate portion (222A), and the first annular wall portion (223A) jointly define the accommodation space (C2), wherein:

the flow guide member (28) comprises a shielding body (282) and a pipe portion (281) communicating with each other, an open end of the shielding body (282) is mounted to the substrate portion (222A) to accommodate the valve member (27) and the central cylindrical portion (226A) in the shielding body (282), the interior of the shielding body (282) is in fluid communication with the accommodation space (C2) and the first water outlet (15);

the substrate portion (222A) is provided with a central through hole (2221), the central through hole (2221) is located on a radial inner side of the central cylindrical portion (226A) and in fluid communication with the first filtered fluid channel (F1); and the valve member (27) is configured to cause the interior of the shielding body (282) to be selectively in fluid communication with the first filtered fluid channel (F1) by means of the central through hole (2221).

11. The filter cartridge (2) according to claim 10, wherein the valve member (27) comprises:

a valve seat (271), wherein the valve seat (271) is provided with a window portion (2715), the valve seat (271) is mounted in the central cylindrical portion (226A), the valve seat (271) sealedly engages with an inner wall of the central cylindrical portion (226A), and the window portion (2715) is in fluid communication with the interior of the shielding body (282); and a piston (272), wherein the piston (272) is capable of moving axially in the valve seat (271) to establish or interrupt fluid communication between the window portion (2715) and the first filtered fluid channel (F1).

12. The filter cartridge (2) according to claim 11, wherein the valve member (27) further comprises an elastic element (273) provided on the piston (272);

when fluid pressure of the first filtered fluid in the first filtered fluid channel (F1) is sufficient to overcome a force applied on the piston (272) by a fluid in the flow guide member (28) and the elastic element (273), the piston (272) moves to an open position so that the window portion (2715) is in fluid communication with the first filtered fluid channel (F1); and when the fluid pressure of the first filtered fluid in the first filtered fluid channel (F1) is not sufficient to overcome the force applied on the piston (272) by the fluid in the flow guide member (28) and the elastic element (273), the piston (272) moves to a closed position so that the fluid communication between the window portion (2715) and the first filtered fluid channel (F1) is interrupted.

13. The filter cartridge (2) according to claim 10, wherein the pipe portion (281) of the flow guide member (28) is connected to a first water outlet pipe (24), or is integrally formed with the first water outlet pipe (24), the first filtered fluid flows toward the second water outlet (16) by means of a second filtered fluid channel (F2) in the cover (23) after being filtered by the rear filtration medium.

14. The filter cartridge (1, 1A, 2) according to claim 1, wherein the front filtration medium comprises a first filtration medium (31) and a second filtration medium (32), and the rear filtration medium comprises a third filtration medium (33).

15. The filter cartridge (1, 1A, 2) according to claim 14, wherein the raw water is municipal tap water, the first filtration medium (31) is mounted around the second filtration medium (32) and is located on a radial outer side of the second filtration medium (32), the second filtration medium (32) has a hollow cylindrical shape, and the first filtered fluid channel (F1) is at least partially formed in the second filtration medium (32).

16. A filter, the filter comprising a water faucet, characterized in that the filter further comprises the filter cartridge (1, 1A, 2) according to claim 1, wherein the water faucet can be operated so that a water outlet end of the water faucet selectively communicates with one or both of the first water outlet (15) and the second water outlet (16) of the filter cartridge (1, 1A, 2).

17. The filter according to claim 16, wherein when the water outlet end of the water faucet communicates with the second water outlet (16), the first filtered fluid flows toward the water outlet end from the second water outlet (16) after being filtered by the rear filtration medium.

18. A filter cartridge (1, 1A, 2), the filter cartridge (1, 1A, 2) comprising:

a filter cartridge housing portion (10), the filter cartridge housing portion (10) being provided with a water inlet (14); and a filtration unit (20), the filtration unit (20) being provided in the filter cartridge housing portion (10);

the filter cartridge being characterized in that the filtration unit (20) is provided with a front filtration medium and a rear filtration medium; the filtration unit (20) is configured to cause raw water flowing into the filter cartridge housing portion (10) by means of the water inlet (14) to be filtered by the front filtration medium to obtain a first filtered fluid; and the first filtered fluid selectively flows toward a first water outlet (15), and/or flows toward a second water outlet (16) after being filtered by the rear filtration medium;

wherein the filtration unit (20) comprises a hollow cover (23), an inner housing (22, 22A), and a mounting base (21); the cover (23) is sealedly connected to the inner housing (22, 22A);

the front filtration medium is mounted between the inner housing (22, 22A) and the mounting base (21); a first filtered fluid channel (F1) is formed in the filtration unit (20); the first filtered fluid filtered by the front filtration medium enters the first filtered fluid channel (F1);

an accommodation space (C1, C2) is formed in the inner housing (22, 22A); the rear filtration medium is provided in the accommodation space (C1, C2); the inner housing (22, 22A) is configured so that the accommodation space (C1, C2) is located downstream of the first filtered fluid channel (F1), in fluid communication with the second water outlet (16), and selectively in fluid communication with the first filtered fluid channel (F1);

wherein the filtration unit (20) further comprises a valve member (41, 27) provided in the inner housing (22, 22A), and the valve member (41, 27) is configured to selectively open or close according to fluid pressure in the filter cartridge (1, 1A, 2) so that one or both of the first water outlet (15) and the second water outlet (16) are selectively in fluid communication with the first filtered fluid channel (F1); and wherein the first water outlet (15) is in fluid communication with the first filtered fluid channel (F1), and the valve member (41) is configured to selectively cause the second water outlet (16) to be in fluid communication with the first filtered fluid channel (F1).

* * * * *